(12) United States Patent
Tijoriwala et al.

(10) Patent No.: US 11,540,305 B2
(45) Date of Patent: Dec. 27, 2022

(54) RESOURCE SELECTION FOR ULTRA-RELIABLE LOW-LATENCY COMMUNICATION (URLLC) UPLINK

(71) Applicant: Samsung Electronics Co., Ltd., Suwon-si (KR)

(72) Inventors: Vaishal Sujal Tijoriwala, Bangalore (IN); Anusha Gunturu, Bangalore (IN); Ashok Kumar Reddy Chavva, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/931,058

(22) Filed: May 13, 2020

(65) Prior Publication Data
US 2020/0367268 A1 Nov. 19, 2020

(30) Foreign Application Priority Data

May 14, 2019 (IN) .............................. 201941019255
May 7, 2020 (IN) ............................ 2019 41019255

(51) Int. Cl.
H04W 72/12 (2009.01)
H04W 72/02 (2009.01)
(Continued)

(52) U.S. Cl.
CPC ..... H04W 72/1268 (2013.01); H04W 52/365 (2013.01); H04W 72/02 (2013.01);
(Continued)

(58) Field of Classification Search
None
See application file for complete search history.

(56) References Cited

U.S. PATENT DOCUMENTS

2018/0206246 A1  7/2018  Zhang et al.
2019/0132862 A1  5/2019  Jeon et al.
(Continued)

FOREIGN PATENT DOCUMENTS

WO    2018/064615 A1    4/2018

OTHER PUBLICATIONS

ZTE, 'Enhanced for UL grant free transmission', R1-1906414, 3GPP TSG RAN WG1 #97, Reno, USA, May 3, 2019.
(Continued)

Primary Examiner — Jutai Kao
(74) Attorney, Agent, or Firm — Jefferson IP Law, LLP

(57) ABSTRACT

A method of resource selection by a user equipment (UE) is provided. The method includes detecting a need of an uplink transmission having a plurality of transmission parameters for at least one application from a plurality of applications having an associated transmission requirement. The method includes determining a set of configured grant resources available to the UE along with the associated plurality of grant resource parameters. The method includes determining transmission capability for the set of configured grant resources by analyzing the grant resource parameters. The method includes selecting at least one configured grant resource from the set of configured grant resources satisfying at least one transmission requirement of the at least one application.

10 Claims, 23 Drawing Sheets

(51) Int. Cl.
H04W 52/36 (2009.01)
H04W 72/14 (2009.01)

(52) U.S. Cl.
CPC ... H04W 72/1231 (2013.01); H04W 72/1252 (2013.01); H04W 72/14 (2013.01)

(56) References Cited

U.S. PATENT DOCUMENTS

| | | | |
|---|---|---|---|
| 2019/0261354 A1 | 8/2019 | Fakoorian et al. | |
| 2020/0322969 A1* | 10/2020 | Lin | H04W 72/1242 |
| 2020/0337072 A1* | 10/2020 | Lunttila | H04L 5/0012 |
| 2020/0358493 A1 | 11/2020 | Hao et al. | |
| 2020/0374817 A1* | 11/2020 | Xue | H04W 52/42 |
| 2021/0029763 A1* | 1/2021 | Brown | H04W 76/15 |
| 2021/0307082 A1* | 9/2021 | Wang | H04W 72/0453 |
| 2021/0314982 A1* | 10/2021 | Panteleev | H04W 72/14 |

OTHER PUBLICATIONS

LG Electronics, 'Discussion on resource allocation of mode 1 configured grant for NR V2X', R2-1907654, 3GPP TSG-RAN WG2 Meeting #106, Reno, USA, May 3, 2019.
ZTE, 'Enhanced for UL grant free transmission', R1-1904148, 3GPP TSG RAN WG1 #96bis, Xi'an, China, Apr. 3, 2019.
International Search Report and Written Opinion dated Aug. 14, 2020, issued in International Patent Application No. PCT/KR2020/006296.
Study on Scenarios and Requirements for Next Generation Access Technologies, 3GPP TR 38.913 version 14.2.0 Release 14, May 1, 2017.
Intel Corporation,Uplink grant free transmission for URLLC services, R1-1702242, GPP TSG RAN1 WG Meeting #88Athens, Greece Feb. 13-17, 2017.
Ericsson, Enhancement of Uplink Grant-free transmission for NR URLLC, R1-1810176, 3GPP TSG-RAN1 Meeting #94bis, Chengdu, China, Oct. 8-12, 2018.
Vivo, Enhanced UL grant-free transmission for URLLC, R1-1810397, 3GPP TSG RAN WG1 Meeting #94bis, Chengdu, China, Oct. 8-12, 2018.
Samsung, Potential enhancement for UL grant-free transmission, R1-1810881, 3GPP TSG RAN WG1 Meeting #94bis, Chengdu, China, Oct. 8-12, 2018.
Samsung, Evaluation methodology and KPI for URLLC, R1-163988, 3GPP TSG RAN WG1 Meeting #85, Nanjing, China, May 23-27, 2016.
Lei Wan et al., A Fading-Insensitive Performance Metric for a Unified Link Quality Model, 2006.
Ericsson, Enhancement of Configured Grant for NR URLLC, 3GPP, R1-1901598, 3GPP TSG RAN WG1 Meeting #96, Athens, Greece, Feb. 25-Mar. 1, 2019.
LG Electronics Inc., "Activation/deactivation of multiple CG/SPS configurations" R2-1907882, 3GPP TSG-RAN WG2 Meeting #106, Reno, USA May 13-17, 2019.
Ericsson, "Confirmation MAC CE Design" R2-1906840, 3GPP TSG-RAN WG2 #106, Reno, USA May 13-17, 2019.
Extended European Search Report dated Apr. 29, 2022, issued in European Application No. 20805063.3.

* cited by examiner

RESOURCE SELECTION FOR ULTRA-RELIABLE LOW-LATENCY COMMUNICATION (URLLC) UPLINK

CROSS-REFERENCE TO RELATED APPLICATION(S)

This application is based on and claims priority under 35 U.S.C. § 119(a) of an Indian provisional patent application number 201941019255 (PS), filed on May 14, 2019 in the Indian Intellectual Property Office, and of an Indian Complete patent application number 201941019255 (CS), filed on May 7, 2020, in the Indian Intellectual Property Office, the disclosure of each of which is incorporated by reference in its entirety.

BACKGROUND

1. Field

The disclosure relates to wireless communications and fifth generation (5G) new radio (NR) standards. More particularly, the disclosure relates to resource selection for ultra-reliable low-latency communication (URLLC) uplink.

2. Description of Related Art

Ultra-reliable low-latency communication (URLLC) is a set of features or services supported by fifth generation (5G) new radio (NR) standards. Examples of applications supported by URLLC include but not limited to factory automation, autonomous driving, and remote surgery that require sub-millisecond latency with error rates lower than 1 packet loss in $10^6$ packets. Release 15 (Rel-15) of 3rd Generation Partnership Project (3GPP) specifies URLLC to provide latency in the 1-millisecond range and 99.999 percent reliability or a target block error rate (BLER) in the order of $10^{-9}$ to $10^{-5}$.

Uplink transmission, i.e., transmitting data from user equipment (UE) to a 5G serving base station introduces lot of latency due to use of grant-based transmission using configured grants or transmission with dynamic scheduling. The base station can be typically and interchangeably referred to as (Node B, evolved Node B (eNB), gNB, home enhanced Node B (HeNB). FIG. 1 illustrates a typical sequence of a grant-based transmission. Referring to FIG. 1, during initial uplink transmission, the UE receives new data for transmission in the uplink. The UE then sends a scheduling request (SR) to the gNB at prescheduled opportunity. The gNB then sends scheduled or configured grants (CG) via a physical downlink control channel (PDCCH). Upon receiving the CG, the UE transmits the data on a physical uplink shared channel (PUSCH). Typically, data is sent in units called transport blocks (TB) to which a cyclic redundancy check (CRC) is attached so that the gNB may detect whether the TB was received correctly or with error. To achieve high reliability, the UE relies on hybrid automatic repeat request (HARQ) retransmissions mechanisms. Accordingly, during the HARQ retransmission, the gNB transmits an acknowledgement (ACK) only when data has been successfully received and a negative acknowledgment (NACK) when the received data has an error. The UE then transmits new data upon receipt of the ACK and retransmits same data upon receipt of the NACK. However, such grant-based transmission results in high latency.

To reduce latency, Rel-15 of 3GPP introduced grant-free based transmission for uplink transmission in URLLC so as to send the data soon upon arrival. FIG. 2 illustrates a typical sequence of a grant-free based transmission according to the related art. Referring to FIG. 2, during initial uplink transmission, the UE receives new data for transmission in the uplink and transmits the new data on the PUSCH. During the HARQ retransmission, the UE then transmits new data upon receipt of the ACK and retransmits same data upon receipt of the NACK. However the limitation in Rel-15 is that only one configuration for CG can be configured for one carrier. Also, the UE can start transmission of a TB on transmission occasion with redundancy version (RV) as 0. This results in large latency if a RV sequence 0, 2, 3, 1, is adopted as new data transmission can only happen with RV=0.

As such, Rel-16 of 3GPP introduced grant-free based transmission for uplink transmission with multiple CG for a given bandwidth to support different traffic/service types and for enhancing reliability and reducing latency with variable data size. As such, the UE is configured with multiple CG having different starting time offsets along with other parameters such as number of repetitions ($N_{Rep}$), modulation and coding scheme (MCS), frequency resource blocks ($N_{RB}$), time-domain resources such as the staring time offset and number of symbols, transport block (TB) size, etc. The starting offsets of different multiple resource configurations of configured grant can be non-aligned. This allows flexible starting position according to the packet of URLLC arriving timing as shown in FIG. 3. This allows the UE to choose the nearest configured grant to start a transmission without having to wait long time until the next period. As illustrated in FIG. 4, in light of multiple CG and corresponding different values of parameters associated with each of the CG, the UE is required to choose the best-configuration therefrom.

However, the conventional methodology illustrates the UE choosing a best configuration from amongst the available configurations either randomly, or at-best based on either latency-requirements or transmission power or nearest CG. Thus, it would be desirable to provide a solution that allows the UE at intelligently choosing the best configuration without resorting to any random-selection. Also, it would be desirable to provide a solution that allows configuration of other network-elements (such as base station) to allow identification of a subset of all configured-grants that are best-suited for an uplink transmission for the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is provided to introduce a selection of concepts in a simplified format that is further described in the detailed description of the disclosure. This summary is not intended to identify key or essential inventive concepts of the claimed subject matter, nor is it intended for determining the scope of the claimed subject matter. In accordance with the purposes of the disclosure, the disclosure as embodied and broadly described herein describes methods of resource selection for a user equipment, the user equipment thereof, and a serving base station thereof.

Additional aspects will be set forth in part in the description which follows and, in part, will be apparent from the description, or may be learned by practice of the presented embodiments.

In accordance with an aspect of the disclosure, a method of resource selection by a user equipment (UE) is provided. The method includes detecting a need of an Uplink Transmission having a plurality of Transmission Parameters for at least one application from a plurality of applications having an associated transmission requirement. The method includes determining a set of configured Grant Resources available to the UE along with their associated plurality of Grant Resource parameters. The method includes determining transmission capability for the set of configured Grant Resources by analyzing the Grant Resource Parameters. The method includes selecting at least one configured grant resources from the set of configured grant resources satisfying at least one transmission requirement of the at least one application.

In accordance with another aspect of the disclosure, a user equipment (UE) performing resource selection is provided. The UE includes at least one processor configured to execute computer readable instructions to detect a need of an uplink transmission having a plurality of transmission parameters for at least one application from a plurality of applications having an associated transmission requirement, determine a set of configured grant resources available to the UE along with an associated plurality of grant resource parameters, determine transmission capability for the set of configured grant resources by analyzing the plurality of grant resource parameters, and select at least one configured grant resource from the set of configured grant resources satisfying at least one transmission requirement of the at least one application.

In accordance with another aspect of the disclosure, a method of resource selection for user equipment by a base station is provided. The method includes obtaining information related to channel conditions for one or more configured grant resources available to a user equipment (UE). The method includes determining a set of configured grant resources from the one or more configured grant resources for the uplink transmission based on the information and a set of configured grant parameters corresponding to each of the one or more configured grant resources. The method includes transmitting, to the UE, information corresponding to the set of configured grant resources.

In accordance with another aspect of the disclosure, a base station performing resource selection for user equipment is provided. The base station includes at least one processor configured to obtain information related to channel conditions for one or more configured grant resources available to a user equipment (UE). The at least one processor is configured to determine a set of configured grant resources from the one or more configured grant resources for the uplink transmission based on the information and a set of configured grant parameters corresponding to each of the one or more configured grant resources. The at least one processor is configured to transmitting, to the UE, information corresponding to the set of configured grant resources.

Some advantages of the disclosure include, but not limited to, enabling the UE to intelligently choose the best configuration without resorting to any random-selection. Also, the claimed disclosure enables the base station to identify a subset of all configured-grants that are best-suited for an uplink transmission for the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 1:
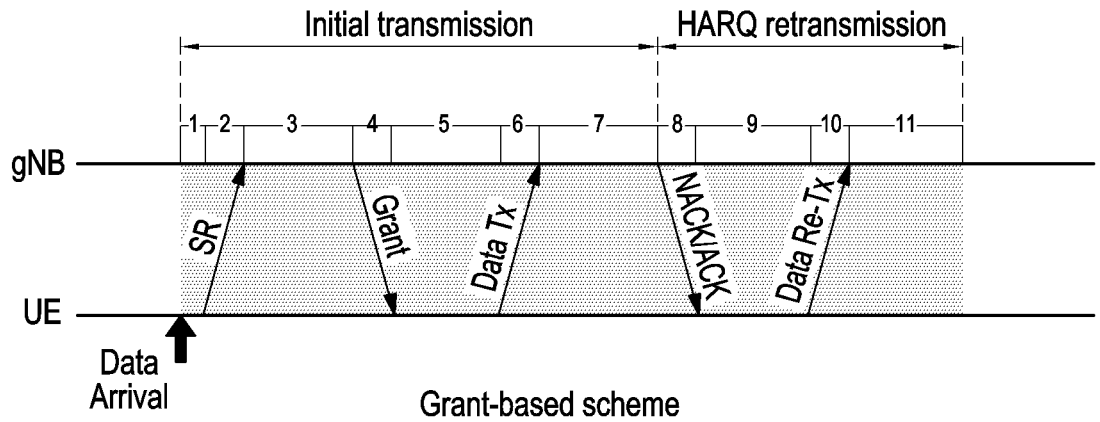
FIG. 1 illustrates a typical sequence of a grant-based transmission according to the related art.
Figure 2:
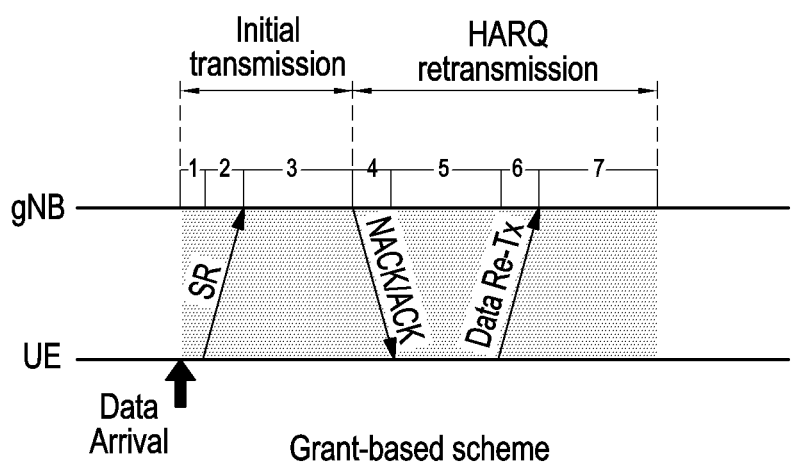
FIG. 2 illustrates a typical sequence of a grant-free based transmission according to the related art.
Figure 3:
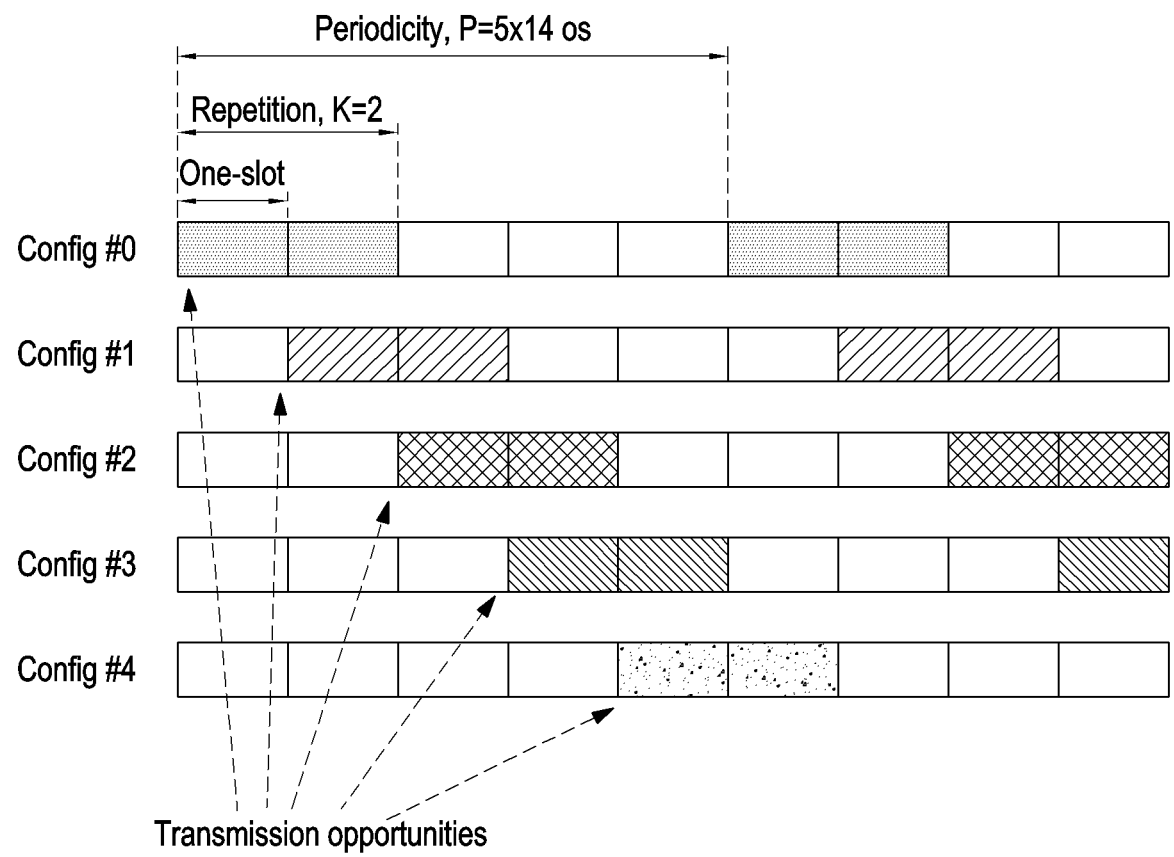
FIG. 3 illustrates a typical sequence of multiple configured grants (CGs) with associated parameters according to the related art.
Figure 4:
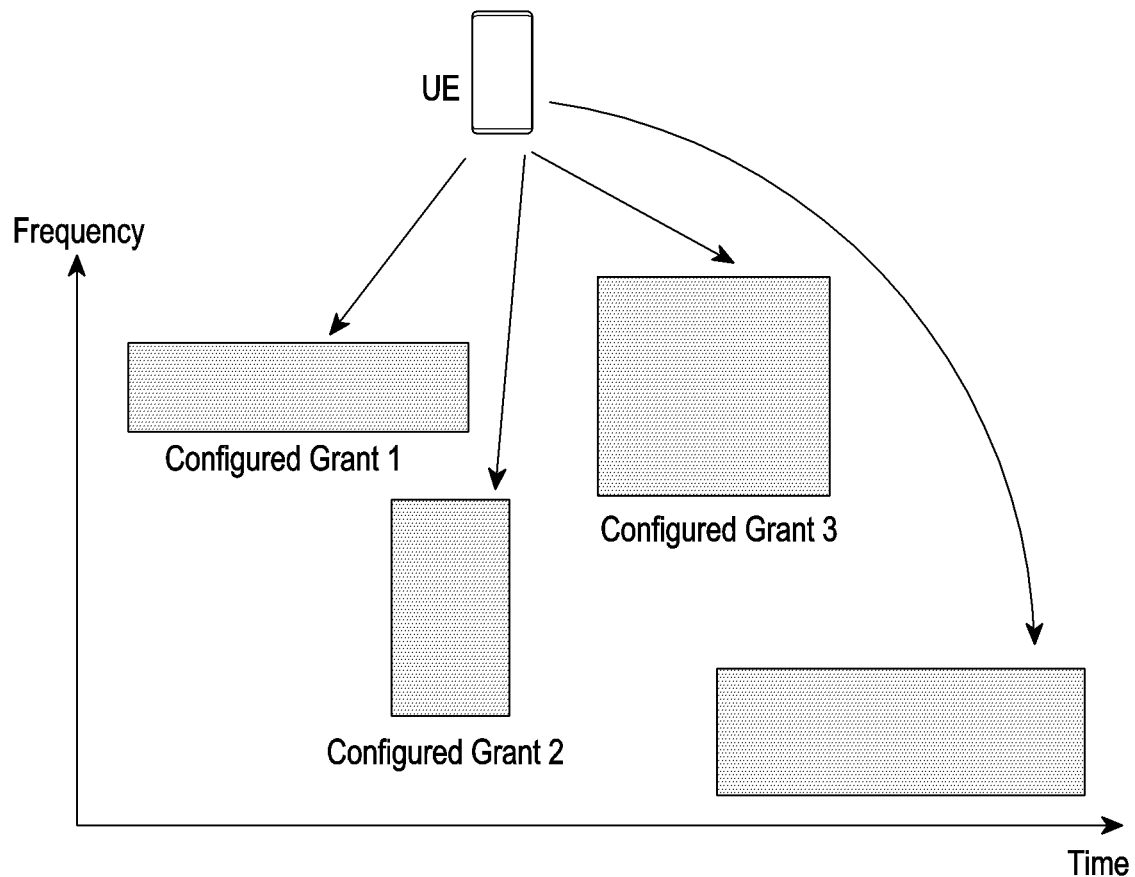
FIG. 4 illustrates a typical selection of a CG from multiple CGs according to the related art.

Further, skilled artisans will appreciate that elements in the drawings are illustrated for simplicity and may not have been necessarily been drawn to scale. For example, the flow charts illustrate the method in terms of some operations involved to help to improve understanding of aspects of the disclosure. Furthermore, in terms of the construction of the device, one or more components of the device may have been represented in the drawings by conventional symbols, and the drawings may show some specific details that are pertinent to understanding some example embodiments of the inventive concepts so as not to obscure the drawings with details that will be readily apparent to those of ordinary skill in the art having benefit of the description herein.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purpose of promoting an understanding of the principles of the disclosure, reference will now be made to some example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skill in the art to which this disclosure belongs. The system, methods, and examples provided herein are illustrative only and not intended to be limiting. Embodiments of the disclosure will be described below in detail with reference to the accompanying drawings.

Figure 5:
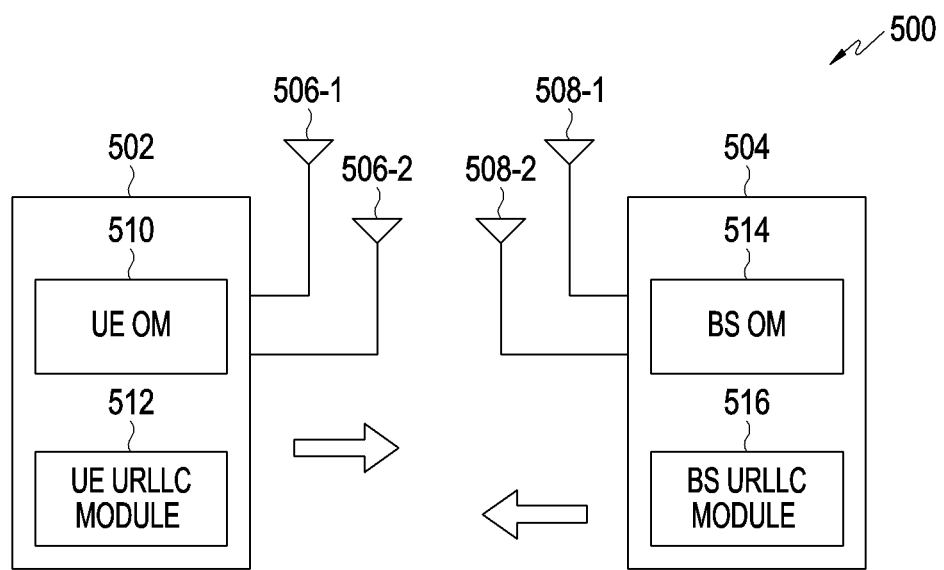
FIG. 5 illustrates a block diagram of network environment depicting interaction between user equipment and a base station implementing ultra-reliable and low-latency communication (URLLC) operations or services, according to an embodiment of the disclosure.

FIG. 5 illustrates a block diagram of network environment depicting interaction between a user equipment and a base station implementing ultra-reliable and low-latency communication (URLLC) operations or services, according to an embodiment of the disclosure.

Referring to FIG. 5, FIG. 5 illustrates a block diagram of network environment 500 depicting interaction between user equipment 502 and a base station 504 implementing ultra-reliable and low-latency communication (URLLC) operations or services, according to an embodiment of the disclosure.

The user equipment 502 (hereinafter referred to as the "UE 502") can be any electronic device used to communicate voice and/or data to the base station 504, which in turn may communicate with a network of devices (e.g., public switched telephone network (PSTN), the Internet, etc.). Examples of the UE 502 include but not limited to smart phones, laptops, notebooks, tablets, smart watches, personal digital assistants (PDAs), etc. The UE 502 may be alternatively and/or interchangeably referred to as mobile station, wireless communication device, subscriber device, mobile terminal, mobile device, etc., as per 3rd Generation Partnership Project (3GPP). The base station 504 (hereinafter referred to as the "BS 504") can be any electronic device that provides access to a network (e.g., Local Area Network (LAN), the Internet, etc.) to the UE 502. The BS 504 may be alternatively and/or interchangeably referred to as Node B, gNode B (gNB), an evolved Node B (eNB), a home enhanced Node B (HeNB), etc., as per 3rd Generation Partnership Project (3GPP).

The UE 502 may communicate with the BS 504 using antenna(s) 506-1 to 506-2. The BS 504 may communicate with the UE 502 using antenna(s) 508-1 to 508-2. In an example, the UE 502 may transmit signals to the BS 504, e.g., uplink transmission, through the antenna 506-1 and may receive signals from the BS 504, e.g., downlink transmission, through the antenna 506-2. Similarly, the BS 504 may receive signals from the UE 502, e.g., uplink transmission, through the antenna 508-1 and may transmit signals to the BS 504, e.g., downlink transmission, through the antenna 508-2. The UE 502 and the BS 504 may communicate with each other through channels, represented by directional arrows. Uplink channels transmit data from the UE 502 to the BS 504 while the downlink channels transmit data from the BS 504 to the UE 502. Examples of the uplink channel include a PUCCH (Physical Uplink Control Channel) and a PUSCH (Physical Uplink Shared Channel), PRACH (Physical Random Access Channel), etc. For example, the PUSCH may be used for transmitting uplink data (i.e., Transport Block(s), MAC PDU, and/or UL-SCH (Uplink-Shared Channel)). Examples of downlink channels include a PDCCH, a PDSCH, etc. For example, the PDCCH may be used for transmitting Downlink Control Information (DCI). For the sake of brevity, only two antennas are illustrated. However, both the UE 502 and the BS 504 may include any number of antennas.

Fifth generation (5G) wireless communication (also referred to as "New Radio," "New Radio Access Technology" or "NR" by the 3GPP) introduced the use of time/frequency/space resources to allow for ultra-reliable low-latency communication (URLLC) services for the UE 502. The requirements under URLLC are to provide latency in the 1-millisecond range and 99.999 percent reliability or a target block error rate (BLER) in the order of $10^{-9}$ to $10^{-5}$.

Accordingly, the UE 502 may include a UE operations module 510 and a UE URLLC module 512 and the BS 504 may include BS operations module 514 and the BS URLLC module 516. The UE operations module 510 and the BS operations module 514 may enable communications between the UE 502 and the BS 504. The UE URLLC module 512 and the BS URLLC module 516 may perform URLLC operations.

In accordance with the embodiments of the disclosure, the UE 502 providing URLLC services support grant-free uplink transmission with multiple configured grants (CGs) and as the UE 502 and the BS 504 may select configure grant resources for the UE 502 for URLLC UL transmissions. Accordingly, in some embodiments of the disclosure, the UE 502 may use configured resources for a grant-free URLLC UL transmission. As such, the UE 502 may determine a set of configured grant resources from one or more configured grant resources available to the UE 502 for uplink transmission based on a plurality of transmission parameters and a plurality of Uplink Transmission Parameters for the uplink transmission satisfying a plurality of requirements. The UE 502 may select at least one configured grant from the set of configured grant resources based on a determination that the uplink transmission is associated with one of a first type of application and a second type of application. In some embodiments of the disclosure, the BS 504 may allocate URLLC-specific grant-free resources for the UE 502 for URLLC UL transmission. As such, the BS 504 may obtain information related to channel conditions for one or more configured grant resources available to the UE 502. The BS 504 may determine a set of configured grant resources from the one or more configured grant resources for the uplink transmission based on the information and a set of configured grant parameters corresponding to each of the one or more configured grant resources. The BS 504 may transmit information corresponding to the set of configured grant resources to the UE 502 for UL transmission. In some embodiments of the disclosure, the UE 502 may then again select at least one configured grant from the set of configured grant resources, as per aforementioned embodiments.

Constructional and operational details of the UE 502 and the BS 504 are explained in detail in the description of FIGS. 6 to 15.

Figure 6:
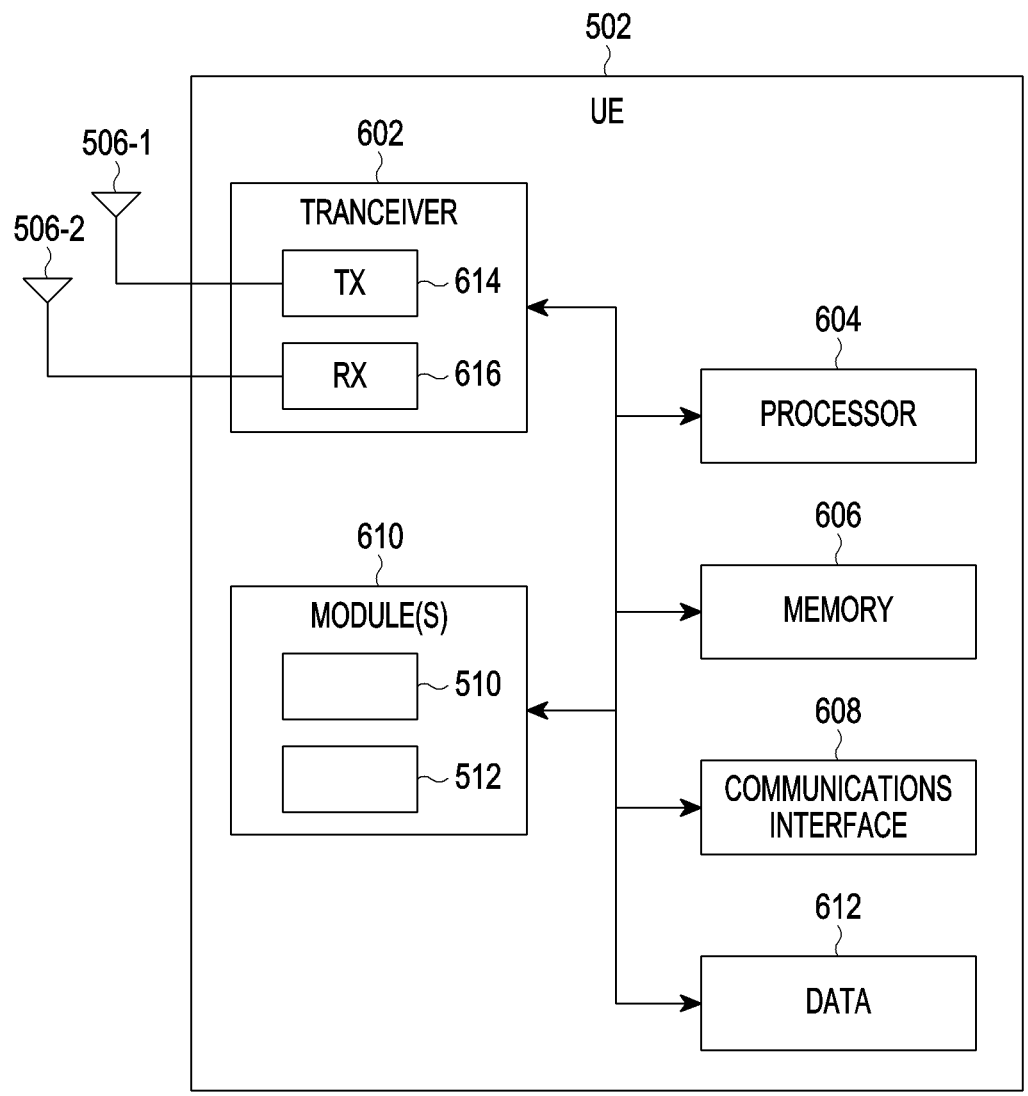
FIG. 6 illustrates a block diagram of the user equipment for performing resource selection in URLLC, according to an embodiment of the disclosure.

FIG. 6 illustrates a block diagram of a user equipment for performing resource selection according to an embodiment of the disclosure.

Referring to FIG. 6, the UE 502 includes a transceiver 602, a processor 604, a memory 606, a communication interface 608, module(s) 610, and data 612. The transceiver 602 may include a transmitter 614 and a receiver 616 for transmitting and receiving signals from the BS 504 through the antennas 506-1 to 506-2. The UE 502 may also include other components such as encoder, decoder, modulator, and demodulator for performing various operations on data being transmitted and received by the UE 502. The transceiver 602, the processor 604, the memory 606, the communication interface 608, the module(s) 610, and the data 612 may be communicatively coupled with each other. The data 612 may serve, amongst other things, as a repository for storing data processed, received, and/or generated by the module(s) 610. The communications interface 608 may enable access to functions of the UE 502.

The processor 604 may be a single processing unit or a number of units, all of which could include multiple computing units. The processor 604 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 604 may be configured to fetch and/or execute computer-readable instructions and/or data (e.g., the data 612) stored in the memory 606.

The memory 606 may include any non-transitory computer-readable medium including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The module(s) 610, amongst other things, may include routines, programs, objects, components, data structures, etc., which perform particular tasks or implement data types. The module(s) 610 may also be implemented as, signal processor(s), state machine(s), logic circuitries, and/or any other device or component that manipulate signals based on operational instructions.

Further, the module(s) 610 may be implemented in hardware, instructions executed by at least one processing unit, for e.g., processor 604, or by a combination thereof. The processing unit may comprise a computer, a processor, a state machine, a logic array and/or any other suitable devices capable of processing instructions. The processing unit may be a general-purpose processor which executes instructions to cause the general-purpose processor to perform operations or, the processing unit may be dedicated to perform the required functions. In some example embodiments, the module(s) 610 may be machine-readable instructions (software) which, when executed by a processor/processing unit, perform any of the described functionalities.

In an embodiment, the module(s) 610 may include the UE operations module 510 and the UE URLLC module 512. The UE operations module 510 and the UE URLLC module 512 may be in communication with each other. Further, according to some example embodiment, operation described herein as being performed by any or all of the module(s) 610, the UE operations module 510, and the UE URLLC module 512, may be performed by at least one processor (e.g., the processor 604) executing program code that includes instructions (e.g., the module(s) 610) corresponding to the operations. The instructions may be stored in a memory (e.g., the memory 606).

In accordance with the embodiments of the disclosure, the UE URLLC module 512 performs configured grant resource selection. One or more configured grant resources may be provided to the UE 102 by the BS 504. Accordingly, the UE URLLC module 512 may determine a set of configured grant resources from the one or more configured grant resources available to the UE 502 for uplink transmission based on a plurality of transmission parameters and a plurality of Uplink Transmission Parameters for the uplink transmission satisfying a plurality of requirements. The plurality of transmission parameters include a transport block size of a transport block (TB) for transmission using one or more configured grant resources, a transmission power required for transmission of the transport block, a latency for transmission of the transport block, and a reliability for transmission of the transport block. The set of parameters corresponding to the uplink data packet include a size of the uplink data packet, an arrival time of the uplink data packet, and a transmission power required for transmitting the uplink data packet. The plurality of requirement includes a transport block size requirement wherein the transport block size is one of greater than or equal to the size of the uplink data packet; a transmission power requirement wherein the transmission power required is one of less than or equal to the available transmission power of the UE; a latency requirement wherein the latency is one of less than or equal to a predetermined latency for the uplink transmission; and a reliability requirement wherein the reliability is one of greater than or equal to a predetermined block error rate for the uplink transmission. The plurality of requirement can be applied in any order as explained in below paragraphs.

The UE URLLC module 512 may select at least one configured grant from the set of configured grant resources based on a determination that the uplink transmission is associated with one of a first type of application and a second type of application. The first type of application is having a higher requirement of reliability and a lower requirement of latency. The second type of application is having a higher requirement of reliability, a lower requirement of latency, and a lower requirement of transmission power.

FIGS. 7A to 7C and FIGS. 8A to 8B illustrate flow methods depicting an example mechanism for performing resource selection or configured grant selection, according to various embodiments of the disclosure. In the example, the plurality of requirement are applied in a step-wise manner such that the transport block size requirement is applied first followed by transmission power requirement, latency requirement, and reliability requirement in the order. However, the order in which the requirement are applied is not construed to be a limitation of the disclosure and any order envisioned is within the scope of the disclosure.

Figure 7A:
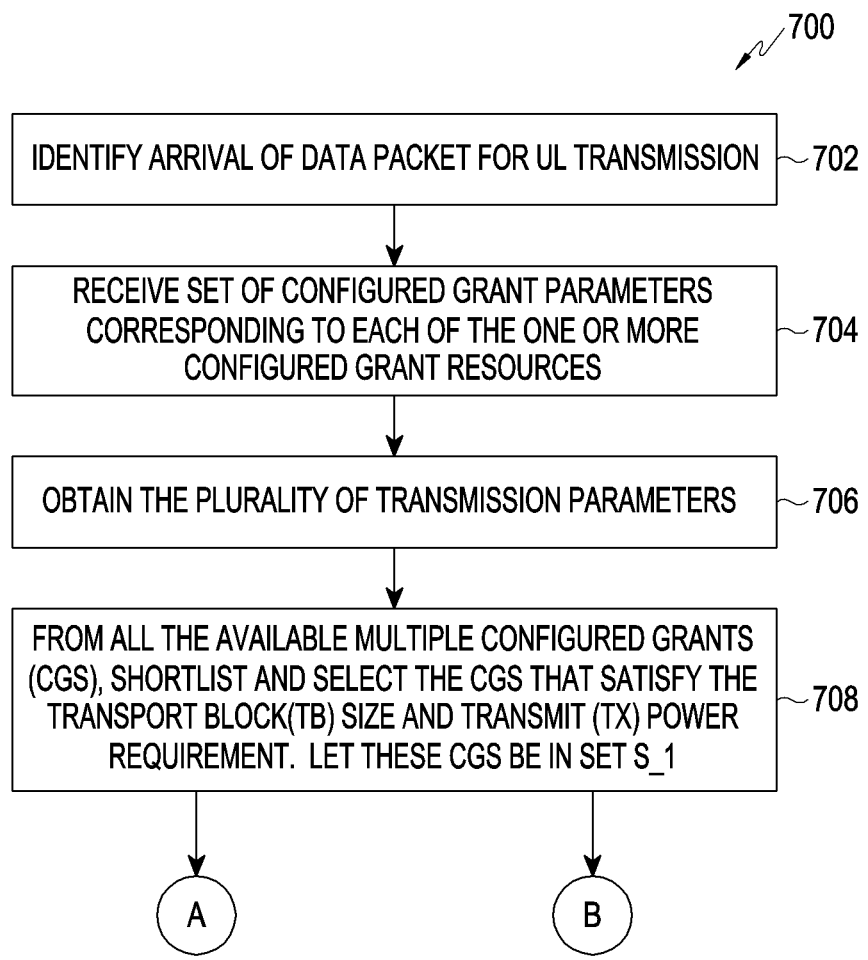
FIGS. 7A, 7B, and 7C illustrate flow methods for performing resource selection or configured grant selection, according to various embodiments of the disclosure.
Figure 7B:
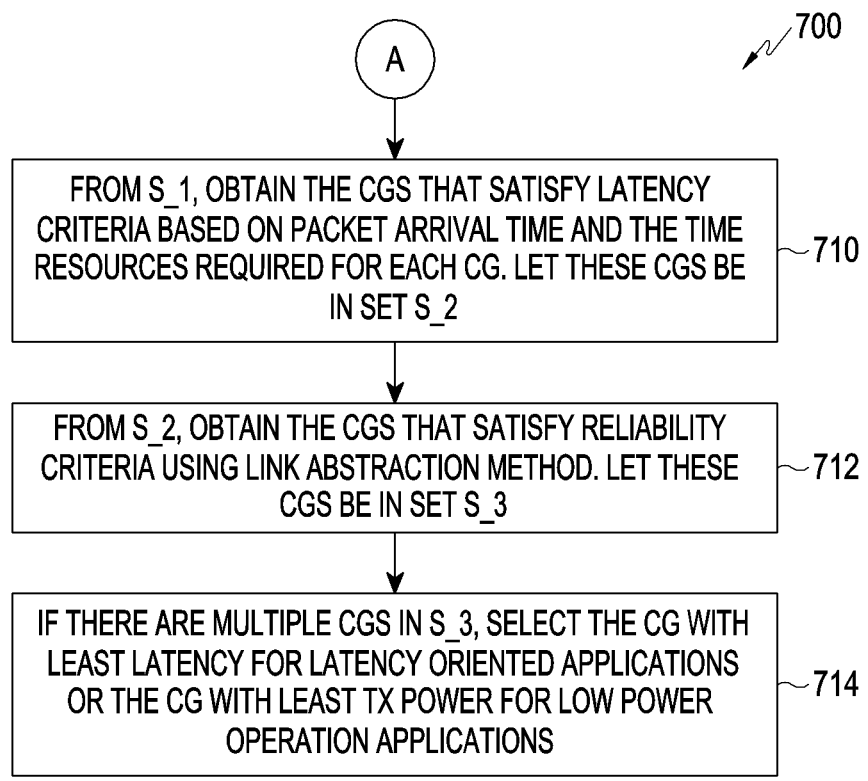

Accordingly, Referring to FIG. 7A depicting the flow method 700, at block 702, the UE URLLC module 512 may identify arrival of data packet for UL transmission, also interchangeably referred to as "the URLLC data packet" and "the UL data packet". In an example, the URLLC data is identified based on QoS Class Identifier (QCI). The UE URLLC module 512 may also obtain set of parameters corresponding to the UL data packet.

At block 704, the UE URLLC module 512 may receive set of configured grant parameters corresponding to each of the one or more configured grant resources from a serving cell, i.e., the BS 504. The set of configured grant parameters includes modulation and coding scheme (MCS), frequency resources including number of resource blocks ($N_{RB}$), and time resources including starting offset ($T_{OFFSET}$), the number of uplink symbols, number of time domain symbols, and repetition factor ($N_{REP}$). The UE URLLC module 512 may also receive downlink reference signals from the serving cell. The UE URLLC module 512 may receive the set of configured grant parameters from the BS 504 through the downlink channel.

At block 706, the UE URLLC module 512 may obtain the plurality of transmission parameters. To this end, the UE URLLC module 512 may determine instantaneous signal to noise plus interference ratio (SINR) of one or more subcarriers corresponding to the one or more configured grant resources. The UE URLLC module 512 may then determine the plurality of transmission parameters based on at least one of the set of configured grant parameters, the set of parameters corresponding to the uplink data packet, the downlink reference signals, and the instantaneous SINR.

At block 708, the UE URLLC module 512 may shortlist and select the CGs that satisfy the transport block (TB) size requirement and transmit (Tx) power requirement from all the available multiple configured grants (CGs). Let such CGs be in set S_1. To this end, the UE URLLC module 512 may determine the TB size based on the number of resource blocks ($N_{RB}$), the number of uplink symbols, and the modulation and coding scheme (MCS) for each of the CGs. The UE URLLC module 512 may determine the TB size. The UE URLLC module 512 may then determine if the TB size is one of greater than or equal to the size of the uplink data packet.

Similarly, the UE URLLC module 512 may determine the transmission power required based on the number of resource blocks ($N_{RB}$) and a downlink path-loss. The UE URLLC module 512 may also determine available power to the UE 502. The UE URLLC module 512 may determine the Tx power. The UE URLLC module 512 may then determine if the transmission power required is one of less than or equal to the available transmission power of the UE 502. If the TB size is one of greater than or equal to the size of the uplink data packet and the transmission power required is one of less than or equal to the available transmission power, the CG is shortlisted in the set S_1. If the TB size is less than the size of the uplink data packet or the transmission power required is greater than the available transmission power, the CG is not shortlisted for the set S_1.

Figure 10A:
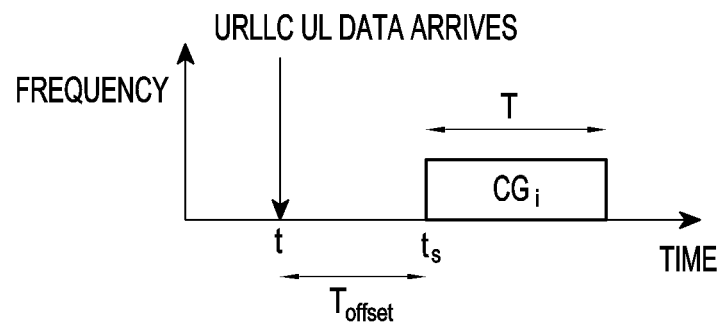
FIGS. 10A, and 10B illustrate an example mechanism for latency calculation in respect of a configured grant, according to various embodiments of the disclosure.

In an implementation, upon selecting the CGs that satisfy the TB size requirement and the Tx power requirement, the UE URLLC module 512 may first obtain the CGs that satisfy the latency requirement. The UE URLLC module 512 may then obtain the CGs that satisfy the reliability requirement from the CGs that satisfied the latency requirement. As such, the method flows to process A from the block 708. Accordingly, referring to FIG. 7B, at block 710, the UE URLLC module 512 may obtain the CGs that satisfy latency requirement based on packet arrival time and the time resources required for each CG. Let these CGs be in set S_2 that are obtained from the set S_1. To this end, the UE URLLC module 512 may determine the latency based on the starting offset, the number of time domain symbols, and the arrival time of the uplink data packet. Referring to FIG. 10A of frequency-time graph for a CG, in an implementation, the URLLC data arrives at time instance 't' and the time resources of CG starts at symbol '$t_s$' based on the starting offset $T_{OFFSET}$ spanning a total of 'T' symbols. As such, the latency L determined for transmission of URLLC data is obtained from Equation 1

$$L=ts-t+T \qquad \text{Equation 1}$$

Upon determining the latency, the UE URLLC module 512 may then determine if latency is one of less than or equal to a predetermined latency for the uplink transmission. The predetermine latency is $L_{URLLC}$~0.5 ms as per the 3GPP. If the determined latency is one of less than or equal to the predetermined latency, the CG is shortlisted for set S_2. If the determined latency is greater than the predetermined latency, the CG is not shortlisted for set S_2.

At block 712, the UE URLLC module 512 may obtain the CGs that satisfy reliability requirement. Let these CGs be in set S_3 that are obtained from the set S_2. To this end, the UE URLLC module 512 may determine the reliability as a predicted block error rate (BLER) based on the modulation and coding scheme (MCS), the downlink reference signals, and the instantaneous signal SINR. The determination of reliability is explained in description of FIGS. 8A, 8B, 9A-9B, 11, 12, and 13 in later paragraphs. The UE URLLC module 512 may then determine if the reliability is one of greater than or equal to a predetermined block error rate for the uplink transmission. The predetermined BLER is BLE- $R_{URLLC} \sim 10^{-5}$ as per the 3GPP. If the determined reliability is one of less than or equal to the predetermined reliability, the CG is shortlisted for set S_3. If the determined reliability is greater than the predetermined latency, the CG is not shortlisted for set S_3.

At block 714, the UE URLLC module 512 may obtain the CGs based on type of application. In one implementation, the UE URLLC module 512 may select CG with least latency for latency oriented applications from the set S_3. Examples of such applications include but not limited to remote surgery and industrial automation, where latency plays is the most important KPI along with reliability. In one implementation, the UE URLLC module 512 may select CG with least Tx power for low power operation applications from the set S_3. Examples of such applications include but not limited to IoT application, where battery life is the most important KPI along with reliability.

In another implementation, upon selecting the CGs that satisfy the TB size requirement and the Tx power requirement, the UE URLLC module 512 may first obtain the CGs that satisfy the reliability requirement. The UE URLLC module 512 may then obtain the CGs that satisfy the latency requirement from the CGs that satisfied the reliability requirement. In such implementation, if a CG is configured with k repetitions, but if the BS 504 is able to decode the transmission in less than k repetitions, and then the UE 502 can stop the transmission of the remaining repetitions. Therefore, if the reliability of the CG is much higher than the URLLC requirement, then the number of repetitions required by the CG will be less and hence the latency for the CG will also be reduced. As such, the method flows to process B from the block 708.

Figure 7C:
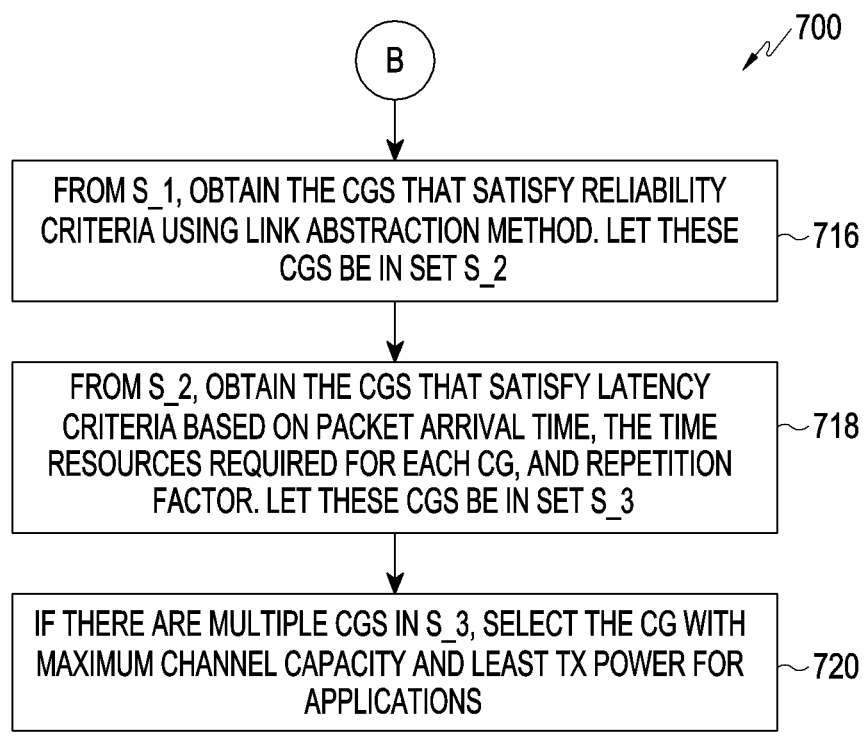

Accordingly, referring to FIG. 7C, at block 716, the UE URLLC module 512 may obtain the CGs that satisfy reliability requirement, in a manner as described at block 712. Let these CGs be in set S_2 that are obtained from the set S_1. The determination of reliability is explained in description of FIGS. 8A, 8B, 9A-9B, 11, 12, and 13 in later paragraphs. The UE URLLC module 512 may then determine if the reliability is one of greater than or equal to a predetermined block error rate for the uplink transmission. The predetermined BLER is $BLER_{URLLC} \sim 10^{-5}$ as per the 3GPP. If the determined reliability is one of less than or equal to the predetermined reliability, the CG is shortlisted for set S_2. If the determined reliability is greater than the predetermined latency, the CG is not shortlisted for set S_2.

Figure 10B:
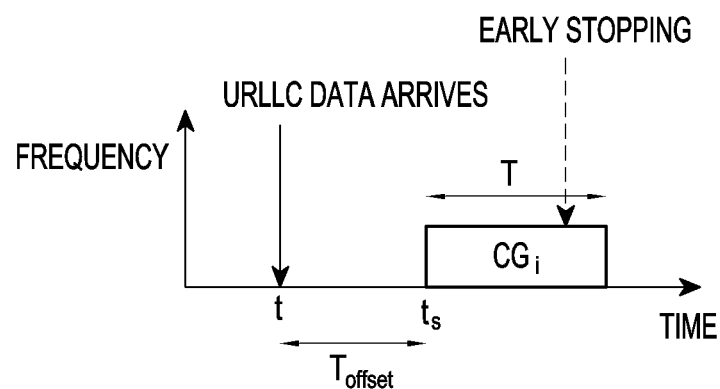

At block 718, the UE URLLC module 512 may obtain the CGs that satisfy latency requirement based on packet arrival time and the time resources required for each CG. Let these CGs be in set S_3 that are obtained from the set S_2. To this end, the UE URLLC module 512 may determine the latency based on the starting offset, the number of time domain symbols, the repetition factor, and the arrival time of the uplink data packet. Referring to FIG. 10B of frequency-time graph for a CG, in an implementation, the URLLC data arrives at time instance 't' and the time resources of CG starts at symbol '$t_s$' based on the starting offset $T_{OFFSET}$ spanning a total of 'T' symbols. In addition, number of repetitions are considered as δ, which result in early stopping of the UL data packet. As such, the latency L determined for transmission of URLLC data is obtained from Equation 2

$$L = ts - t + T + \delta \qquad \text{Equation 2}$$

In an implementation, UE URLLC module 512 may determine Received Bit Information Rate (RBIR) for 1st repetition in a CG to determine channel conditions. The UE URLLC module 512 may then compare the RBIR with threshold γ_RBIR. If RBIR is greater than γ_RBIR, then no further repetitions are transmitted by UE 502. If RBIR is less than γ_RBIR, then the RBIR for the next repetition. The UE URLLC module 512 repeats the process until RBIR to be greater than γ_RBIR and accordingly determines the number of repetitions required by the UE 502.

Figure 8A:
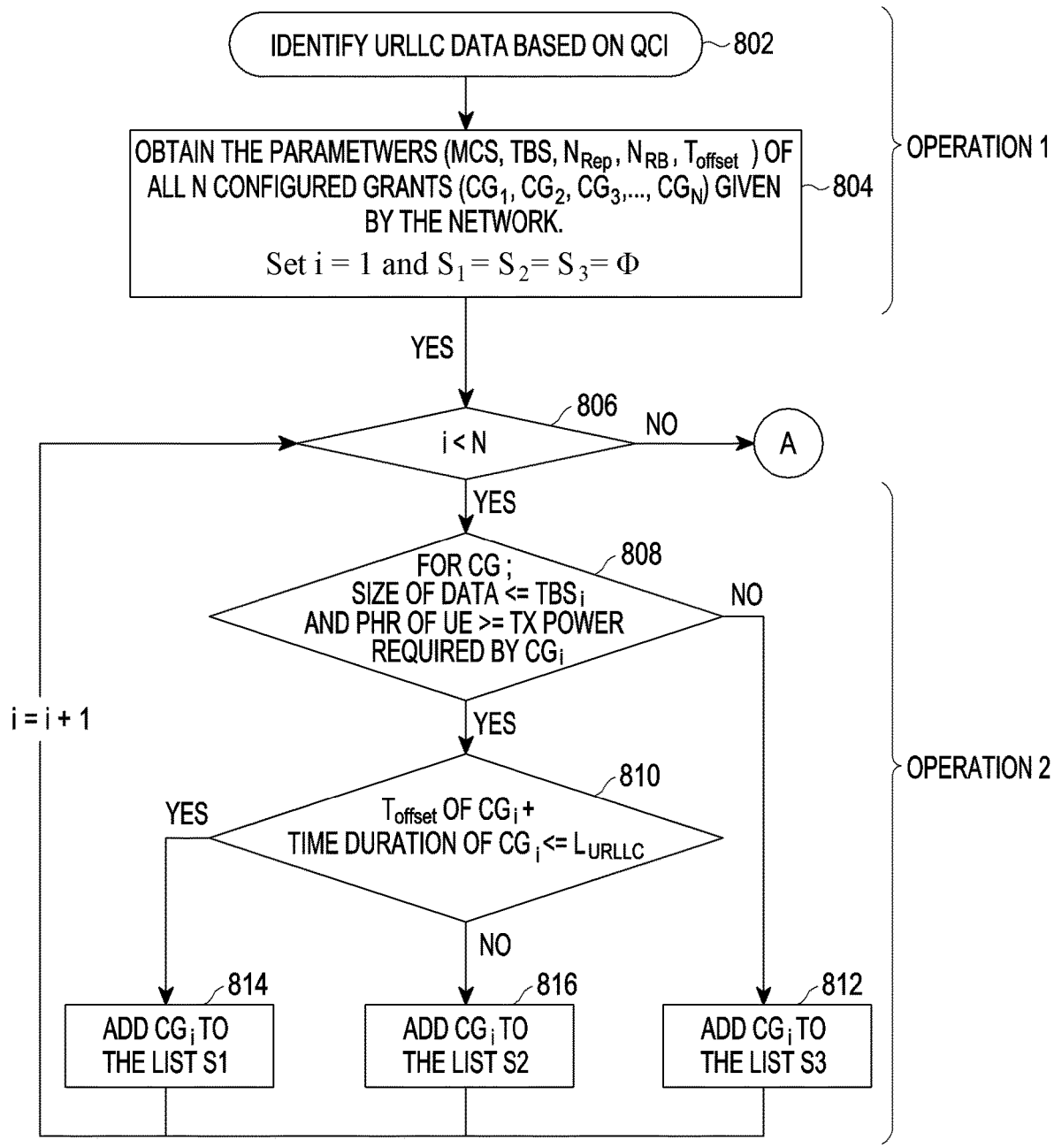
FIGS. 8A, 8B, 9A, and 9B illustrate flow methods depicting example mechanisms for performing resource selection of configured grant selection, according to various embodiments of the disclosure.
Figure 8B:
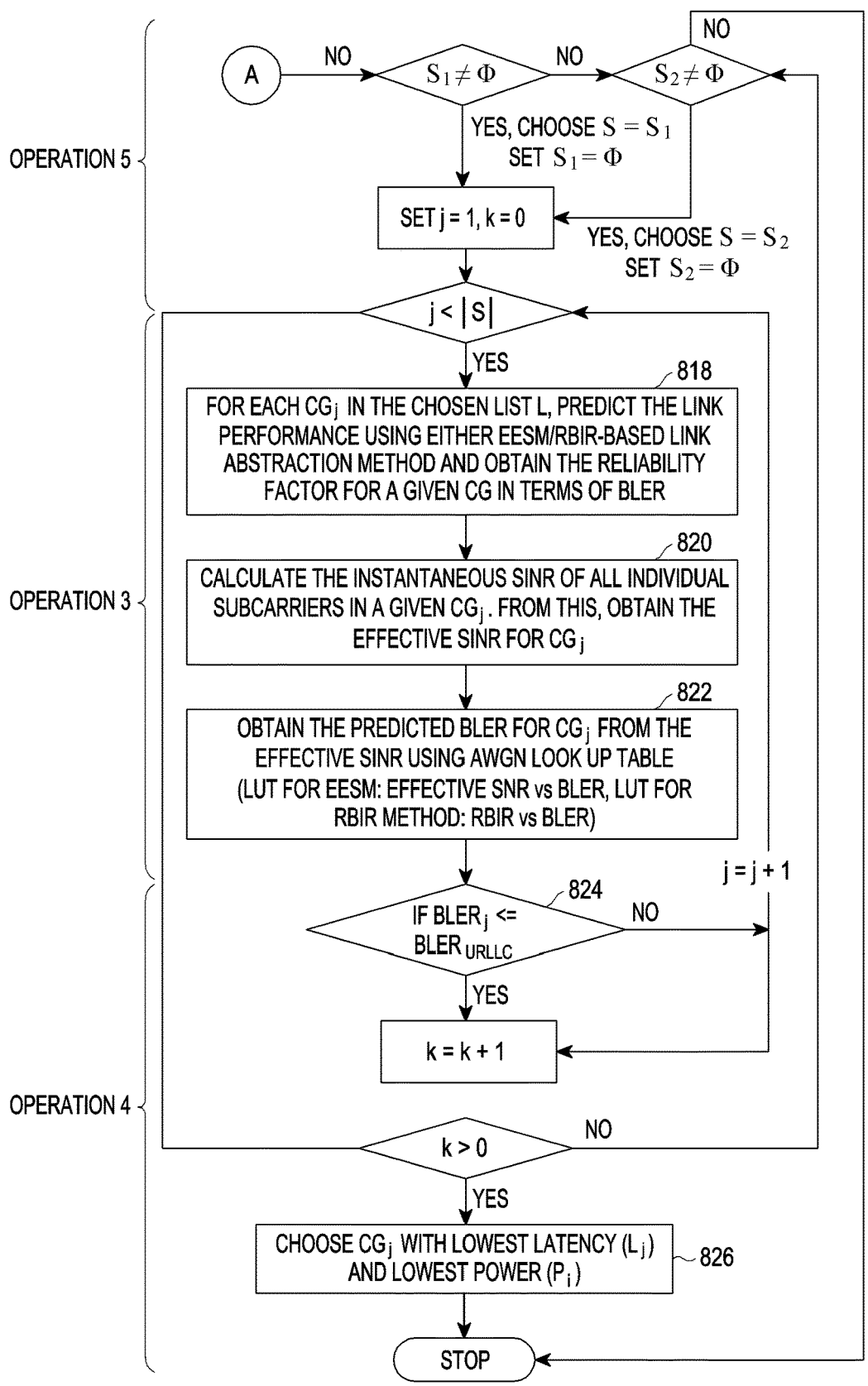

At block 720, the UE URLLC module 512 may obtain the CGs based on type of application. In one implementation, the UE URLLC module 512 may select CG with maximum channel capacity and least Tx power requirement for applications from the set S_3. FIGS. 8A-8B explains a first example mechanism for performing resource selection or configured grant selection, in accordance with some example embodiments of the disclosure. In the first example mechanism, N represents total number of configured grants, predetermined latency $L_{URLLC}$ is ~1 ms, and predetermined block error rate $BLER_{URLLC}$ is ~$10^{-5}$. In the first example mechanism, the available CS are divided into three sets, $S_1$ as set with CG that meet TB size requirement, the Tx power requirement, and the latency requirement; $S_2$ as set with CGs that meet only TB size requirement and the Tx power requirement; and $S_3$ as set with CGs that do not meet both the TB size requirement and the Tx power requirement.

Referring to FIG. 8A, at operation 1, URLLC data and the various parameters are identified. Accordingly, at block 802 URLLC data is identified along with set of parameters corresponding to the UL data packet as explained at block 702. At block 804, the set of parameters corresponding to all N CGs, CG1, CG2 . . . CGN are obtained from the base station 504, as explained at block 704.

At operation 2, the CGs are classified into sets $S_1$, $S_2$ and $S_3$. Accordingly, a finite loop is set at block 802 with 'i' as 1 and $S_1$, $S_2$ and $S_3$ as. At block 806, if 'i' is less than N, the process flow to block 808. At block 808, a determination is made if the CGi satisfy the TB size requirement and the transmission power requirement. The $CG_i$ is selected whose TB size is greater than the size of the UL data and the Tx power required is less than or equal to the power headroom of the UE 502 as explained at block 706 and block 708 and the process flows to 810. If the CG is not selected, the process flows to step 812, where the CG is added to the list $S_3$.

At block 810, a determination is made if the $CG_i$ satisfy the latency requirement. At block 814, the $CG_i$ is selected which meet latency requirement as explained at block 710 are added to the selected list $S_1$. At block 816, if the CG is not selected, the CG is added to the $S_2$. The operation 2 is continued until the TB size requirement, the transmission power requirement, and the latency requirement are checked for all of the N CGs. After this, the process flows to operation 3, connected by A, if 'i' is greater than N.

Referring to FIG. 8B, at operation 3, the CGs are checked for reliability requirement. Accordingly, finite loop is again set up and at block 818 the CGs in the selected list $S_1$, link prediction is performed using RBIR/EESM, and BLER is calculated using AWGN LUT for RBIR-BLER. Link prediction using RBIR/BLER, it may be assumed that the UE 502 is time division duplex (TDD) and the uplink-channel is estimated based on reference signals in the downlink channel within similar frequency range. The downlink reference signals such as CSI-RS, DMRS, and synchronization reference signals can be used for the estimation of the uplink channel, assuming the channel reciprocity for UE 502. Assuming channel coherence over time t, for estimation of the uplink channel at time T, the reference signals in the downlink at time T-t are used.

Figure 11:
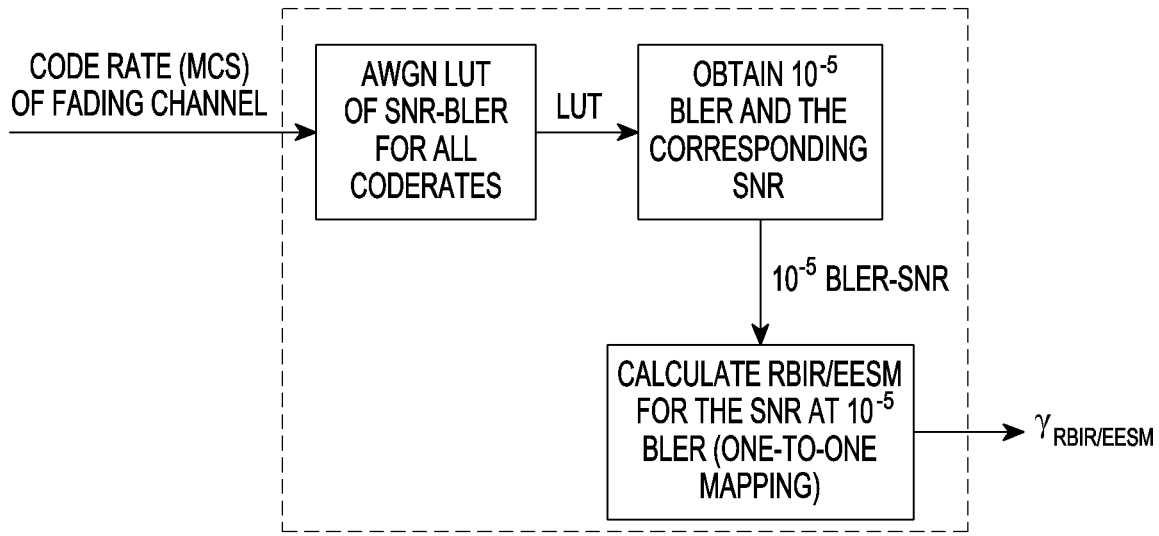
FIG. 11 illustrates an example mechanism for Link-prediction using RBIR/EESM, according to an embodiment of the disclosure.

FIG. 11 illustrates an example mechanism for Link-prediction using RBIR/EESM, according to an embodiment of the disclosure.

Referring to FIG. 11, in an implementation, the mechanism comprises the following method steps of operation:

Step A: Obtain the AWGN BLER performance (LUT for SNR-BLER) for all possible code rates.

Step B: For each code rate, obtain $10^{(-5)}$ ($BLER_{URLLC}$) and the corresponding SNR.

Step C: Obtain the effective SINR metric for EESM ($\gamma_{EESM}$) or RBIR metric ($\gamma_{RBIR}$) for RBIR based method at ($BLER_{URLLC}$). (LUT for code rate and ($\gamma_{EESM/RBIR}$) at $10^{-5}$ BLER)

As may be understood, since the link-prediction is independent of fading, (RBIR/EESM) is used as the threshold to determine whether a configured grant can meet the reliability requirement ($10^{-5}$ BLER) in the instantaneous channel conditions.

Figure 12:
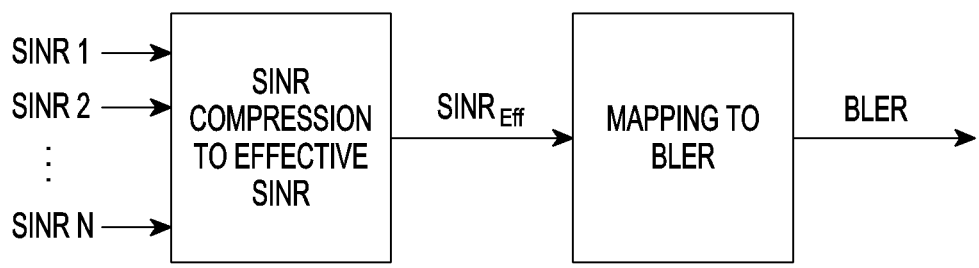
FIG. 12 illustrates an example mechanism for Link-prediction using EESM, according to an embodiment of the disclosure.

FIG. 12 illustrates an example mechanism for Link-prediction using EESM in URLLC system according to an embodiment of the disclosure.

Referring to FIG. 12, in an implementation, EESM (Exponential Effective SINR Mapping) is used to map the instantaneous values of SINRs to the corresponding BLER (Block Error Rate) value. The same is used as a mapping method when all the subcarriers of a specific subscriber are modulated using the same Modulation and Coding Scheme (MCS) level. A rationale behind employment of EESM may include to find a compression function that maps the set of SINR's to a single value that is a good predictor of the actual BLER.

$$\gamma_{\mathit{eff}} = EESM(\gamma, \beta) \equiv -\beta \cdot \ln\left(\frac{1}{N} \cdot \sum_{i=1}^{N} e^{-\frac{\gamma_i}{\beta}}\right)$$

Mentioned above is the formula for EESM, Where, N is the number of subcarriers in a given configuration; $\gamma$ is the vector of per-subcarrier SINR values; $\beta$ is the parameter which needs to be determined for each modulation coding Scheme; $\gamma_{\mathit{eff}}$ is the effective SINR across all the N subcarriers. In an example, the mapping of the effective SINR value to the corresponding BLER value shall use a look-up table for the mapping function.

Figure 13:
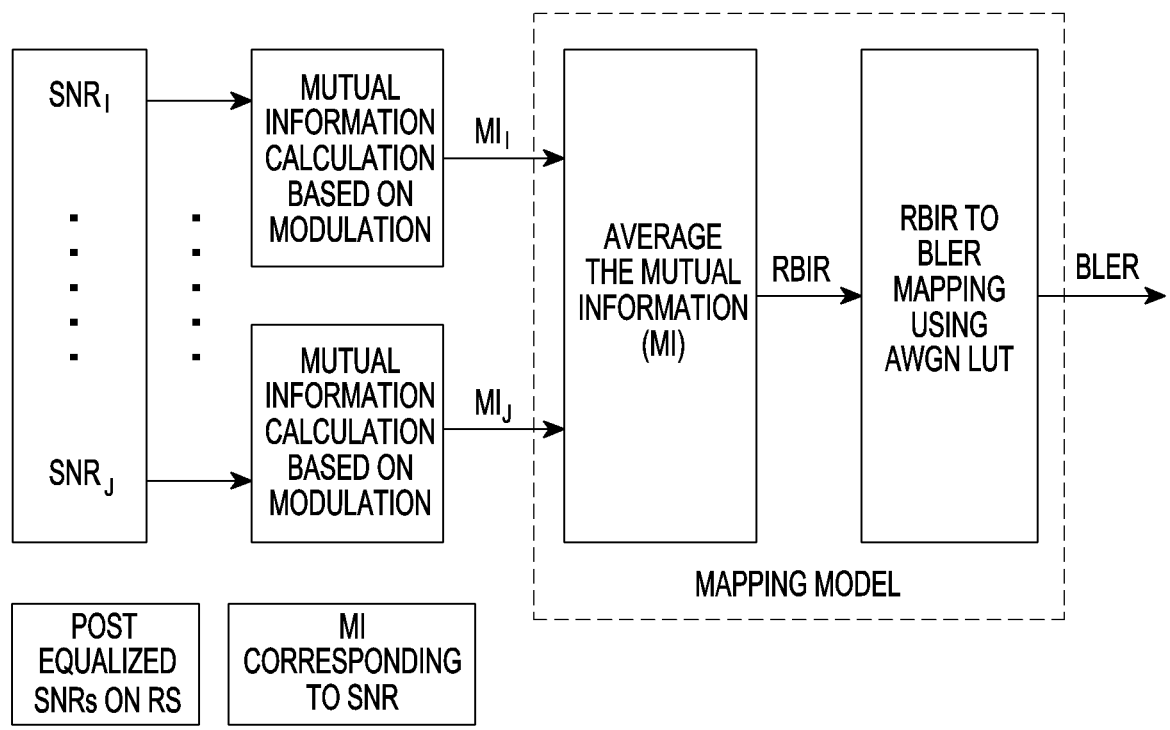
FIG. 13 illustrates an example method for Link prediction in URLLC system based on RBIR, according to an embodiment of the disclosure.

FIG. 13 illustrates an example method for Link prediction in URLLC system based on RBIR.

Referring to FIG. 13, in an implementation, the Received Bit Information Rate (RBIR) is chosen as the decoding-metric to detect the channel conditions according to an embodiment of the disclosure. The method may be based on Link abstraction, which allows us to predict BLER in multicarrier wideband systems, over a multistate channel. At least an advantage of RBIR metric over other method is that it works at the bit-level rather than at symbol level, thereby allowing better accuracy in predicting BLER without resorting to any complex calibration process. The BLER is a binary equivalent channel model, valid for any modulation scheme, and is characterized by means of the Mutual Information (MI) between the transmitted coded bits and the received LLR.

At block 820, instantaneous SINR of all individual subcarriers in the CG is determined. Based on the instantaneous SINR of all individual sub-carriers, an effective SINR for the CG is determined. At block 822, predicted BLER is obtained for the CG based on the effective SINR using AWGN look up table. At block 824, the predicted BLER for the CG is then compared with the predetermined BLER. The process is repeated for all the CGs in the set $S_1$.

At operation 4, if multiple CGs from the set $S_1$ meets the reliability requirement at block 820, CGs are then selected based on the type of application. At block 826, the CG meeting the reliability constraint with least latency is selected.

At operation 5, if none of the CGs from the set $S_1$ meet the reliability requirement, then CGs are chosen from the set $S_2$. Accordingly, operation 3 and operation 4 are repeated from each CG in the set $S_2$.

Figure 9A:
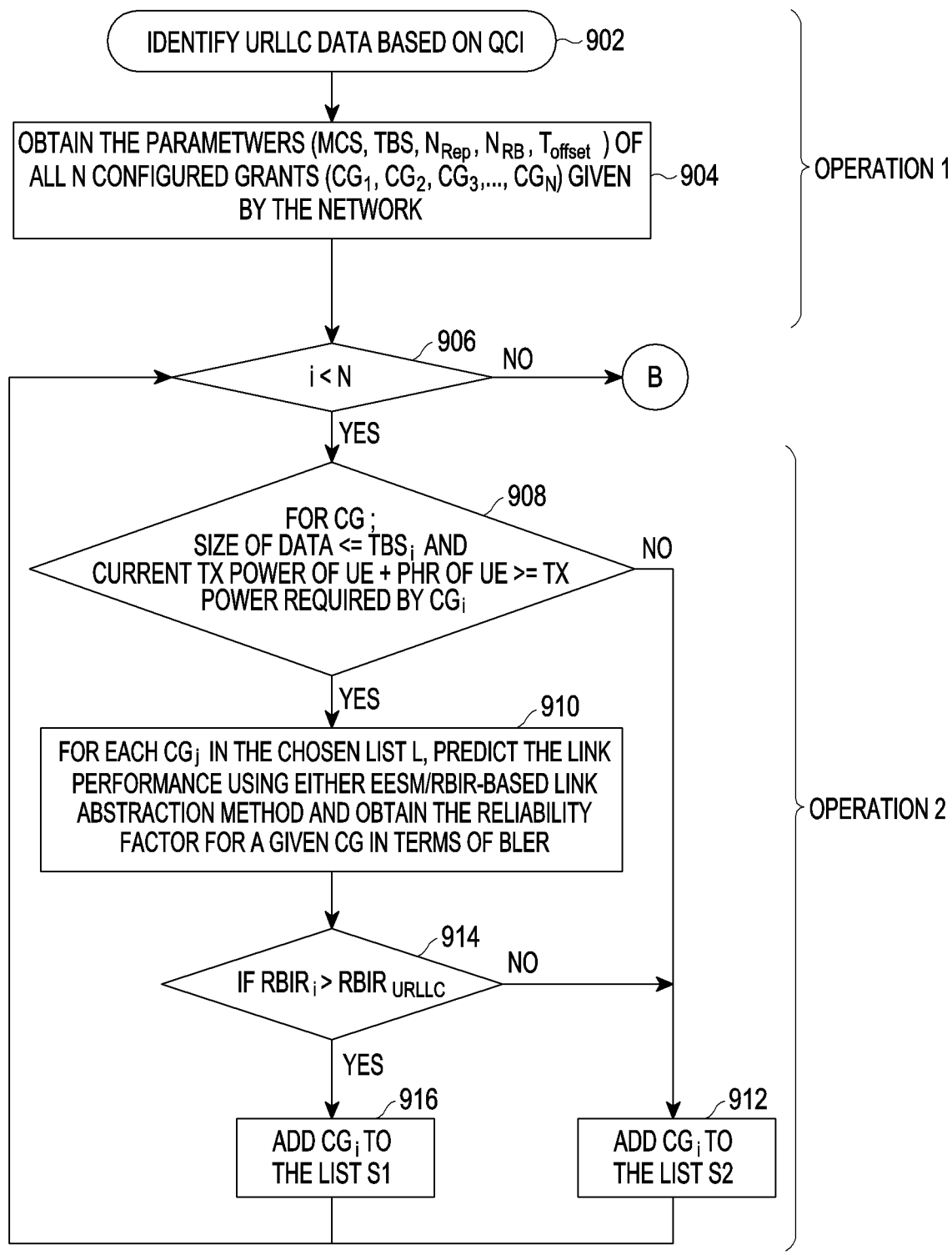
Figure 9B:
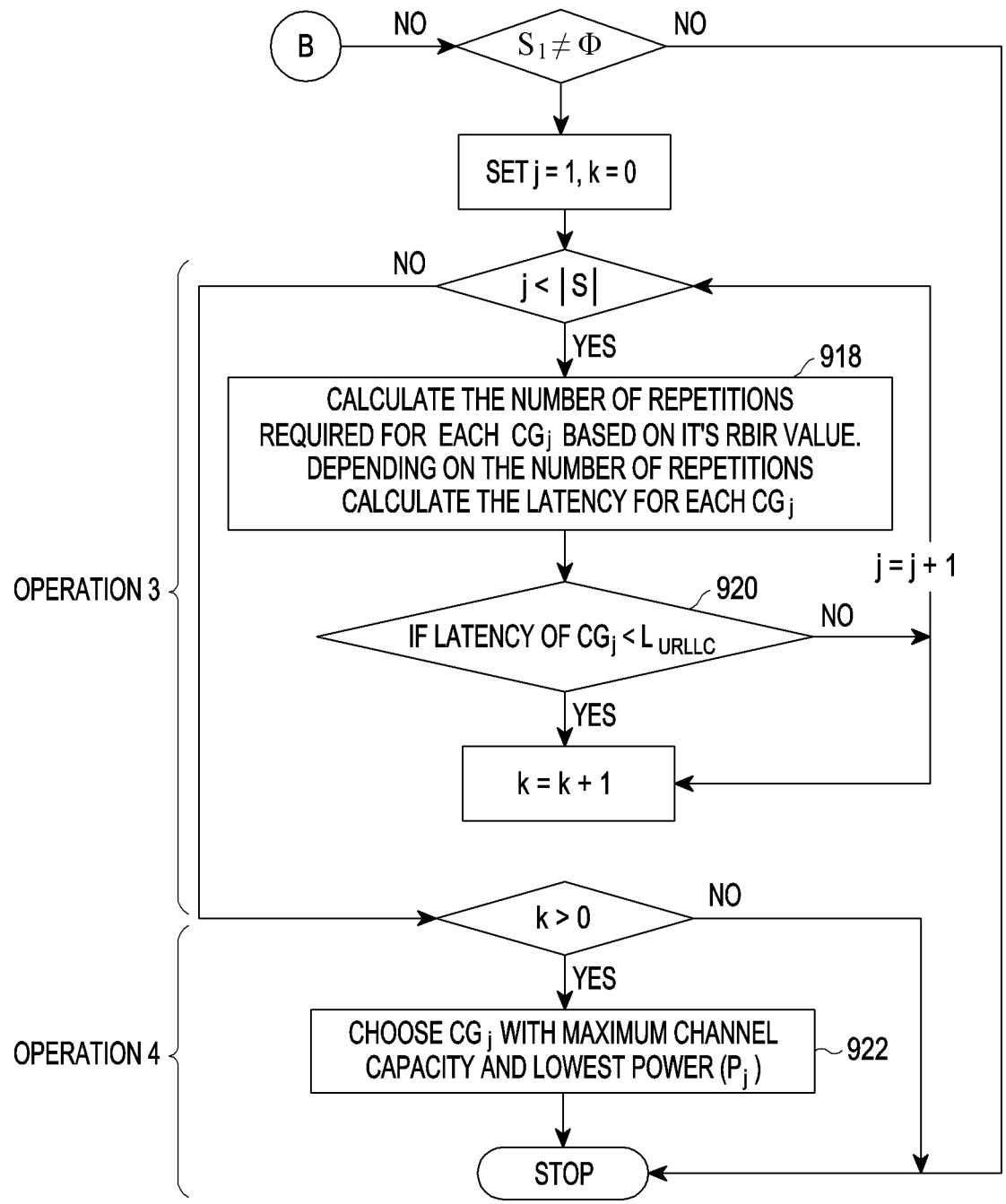

FIGS. 9A-9B explain a second example mechanism for performing resource selection or configured grant selection, in accordance with some example embodiments of the disclosure. In the second example mechanism, N represents total number of configured grants, predetermined latency $L_{URLLC}$ is ~1 ms, and predetermined block error rate $BLER_{URLLC}$ is ~$10^{-5}$. In the second example mechanism, the available CG are divided into two sets, $S_1$ as set with CG that meet TB size requirement, the Tx power requirement, and the reliability requirement; $S_2$ as set with CGs that meet only TB size requirement and/or the Tx power requirement.

Referring to FIG. 9A, at operation 1, URLLC data and the various parameters are identified. Accordingly, at block 902 URLLC data is identified along with set of parameters corresponding to the UL data packet as explained at block 702. At block 904, the set of parameters corresponding to all N CGs, CG1, CG2 . . . CGN are obtained from the base station 504, as explained at block 704.

At operation 2, the CGs are classified into sets $S_1$ and $S_2$. Accordingly, a finite loop is set at block 902 with 'i' as 1 and $S_1$ and $S_2$ as $\phi$. At block 906, if 'i' is less than N, the process flow to block 908. At block 908, a determination is made if the CGi satisfy the TB size requirement and the transmission power requirement. The $CG_i$ is selected whose TB size is greater than the size of the UL data and the Tx power required is less than or equal to the power headroom of the UE 502 as explained at block 706 and block 708 and the process flows to 910. If the CG is not selected, the process flows to step 912, where the CG is added to the list $S_2$.

At step 910, link prediction is performed using RBIR is determined and predicted BLER is determined for the CG, as described above. At block 914, the predicted BLER for the CG is then compared with the predetermined BLER. If the predicted BLER for CG is greater than the predetermined BLER, the CG meters the reliability requirement. As such, at block 916, the CG is added to the list $S_1$. The operation 2 is continued until the TB size requirement, the transmission power requirement, and the reliability requirement are checked for all of the N CGs. After this, the process flows to operation 3, connected by A, if 'i' is greater than N.

Referring to FIG. 9B, at operation 3, the CGs are checked for reliability requirement. Accordingly, a finite loop is set up and at block 918, number of repetitions for the CGs in the selected list $S_1$ based on RBIR value as explained earlier and latency for the CG is determined as explained earlier. At block 920, the determined latency for the CG is then compared with the predetermined latency. The process is repeated for all the CGs in the set $S_1$.

At operation 4, if multiple CGs from the set $S_1$ meets the latency requirement at block 920, CGs are then selected based on the type of application. At block 922, the CG meeting the maximum channel capacity and least power is selected.

Figure 14:
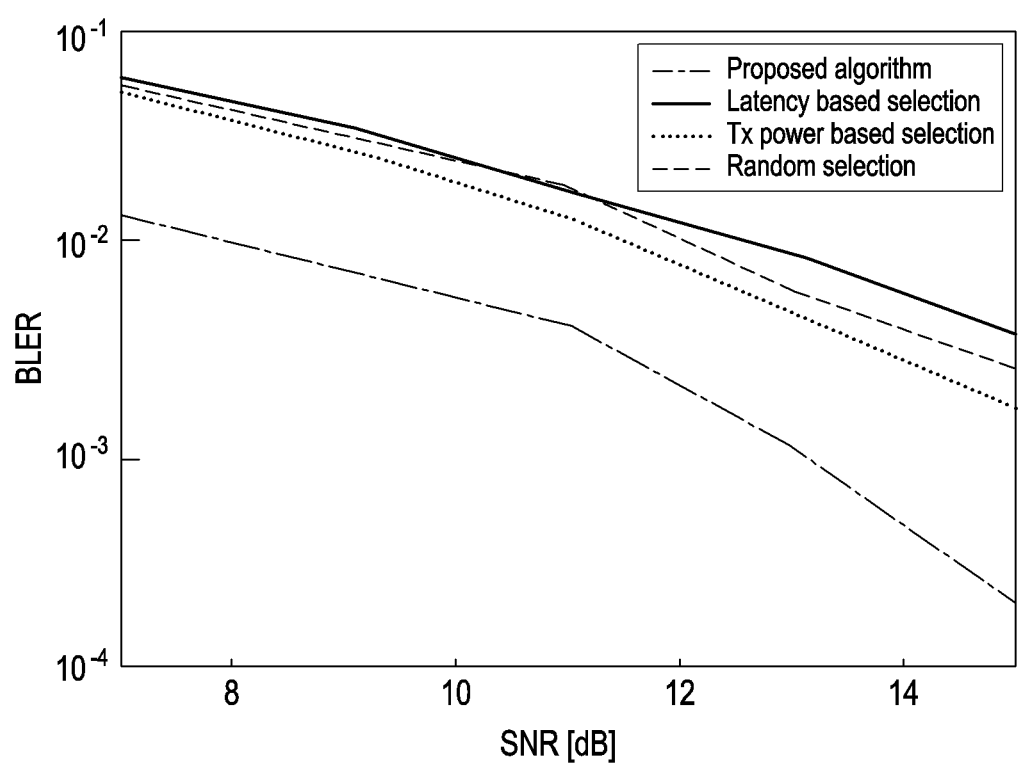
FIG. 14 illustrates simulation results of URLLC system in terms of BLER (Reliability) with respect to multiple configurations with different set of parameters, according to an embodiment of the disclosure.

FIG. 14 illustrates simulation results of URLLC system in terms of BLER (Reliability) with respect to multiple configurations with different set of parameters, according to an embodiment of the disclosure. In an example, the simulation is performed with four different configurations with the associated parameters in below table 1:

TABLE 1

| CG | Parameters |
| --- | --- |
| Configuration 1 | Starting Slot = 0; Start RB = 15 |
| | No. of RBs = 15; No. of Repetitions = 2; MCS = 2 |
| Configuration 2 | Starting Slot = 2; Start RB = 3 |
| | No. of RBs = 25; No. of Repetitions = 1; MCS = 2 |
| Configuration 3 | Starting Slot = 3; Start RB = 8 |
| | No. of RBs = 17; No. of Repetitions = 4; MCS = 2 |
| Configuration 4 | Starting Slot = 7; Start RB = 22 |
| | No. of RBs = 10; No. of Repetitions = 3; MCS = 2 |

Referring to FIG. 14, it shows the comparison between the selection requirement as per the disclosure and other selection requirement in terms of BLER. As seen from FIG. 14, the disclosure outperforms other selection schemes in terms of reliability. As far as reliability gain is concerned, the signal to noise ratio (SNR) gain of approximately 4.5 dB is obtained at BLER $10^{-2}$ as compared to traditional selection schemes.

Figure 15:
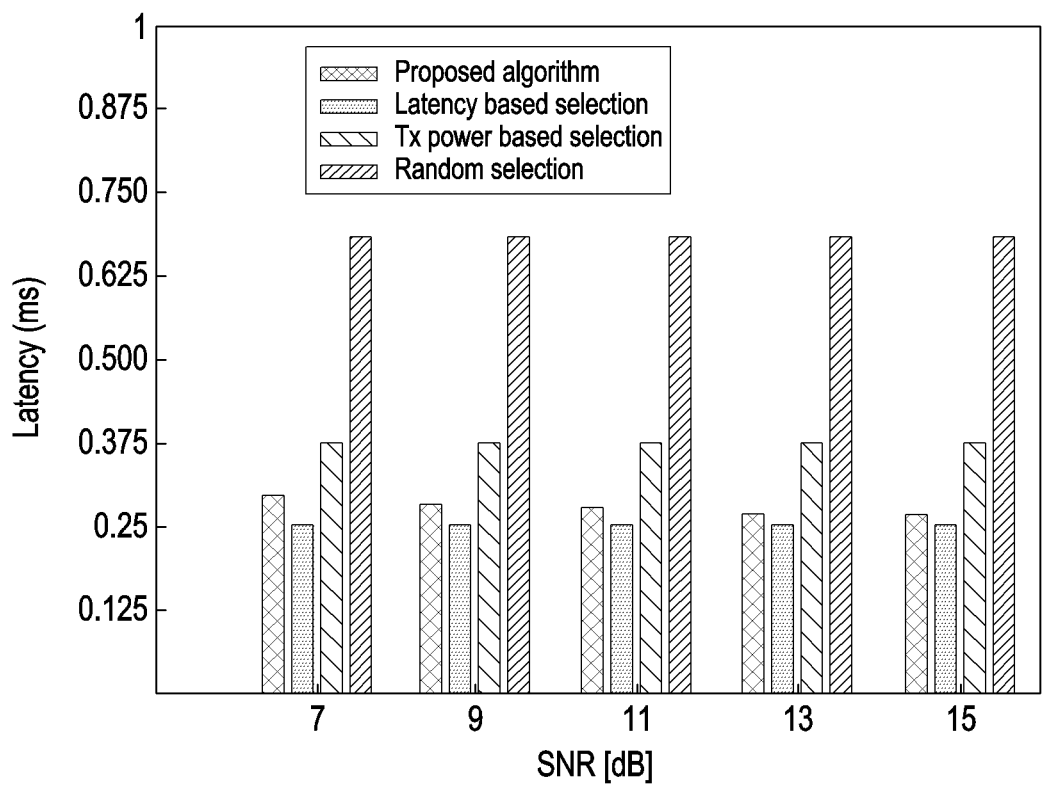
FIG. 15 illustrates simulation results of URLLC system in terms of latency with respect to multiple configurations with different set of parameter, according to an embodiment of the disclosure.

FIG. 15 illustrates simulation results of URLLC system in terms of latency with respect to multiple configurations with different set of parameter, according to an embodiment of the disclosure.

Referring to FIG. 15, it shows the comparison between the proposed mechanism and other selection-requirement in terms of Latency. As seen from FIG. 15, the latency based selection performs only marginally better than the mechanism in terms of latency. But it can be noted that the proposed mechanism performs better than the latency based selection in terms of reliability. An improvement of 60% is obtained in latency by using the proposed mechanism as compared to random selection scheme.

Thus, the disclosure operates significantly better compared to other selection schemes when latency and reliability are considered together at the UE level.

Figure 16:
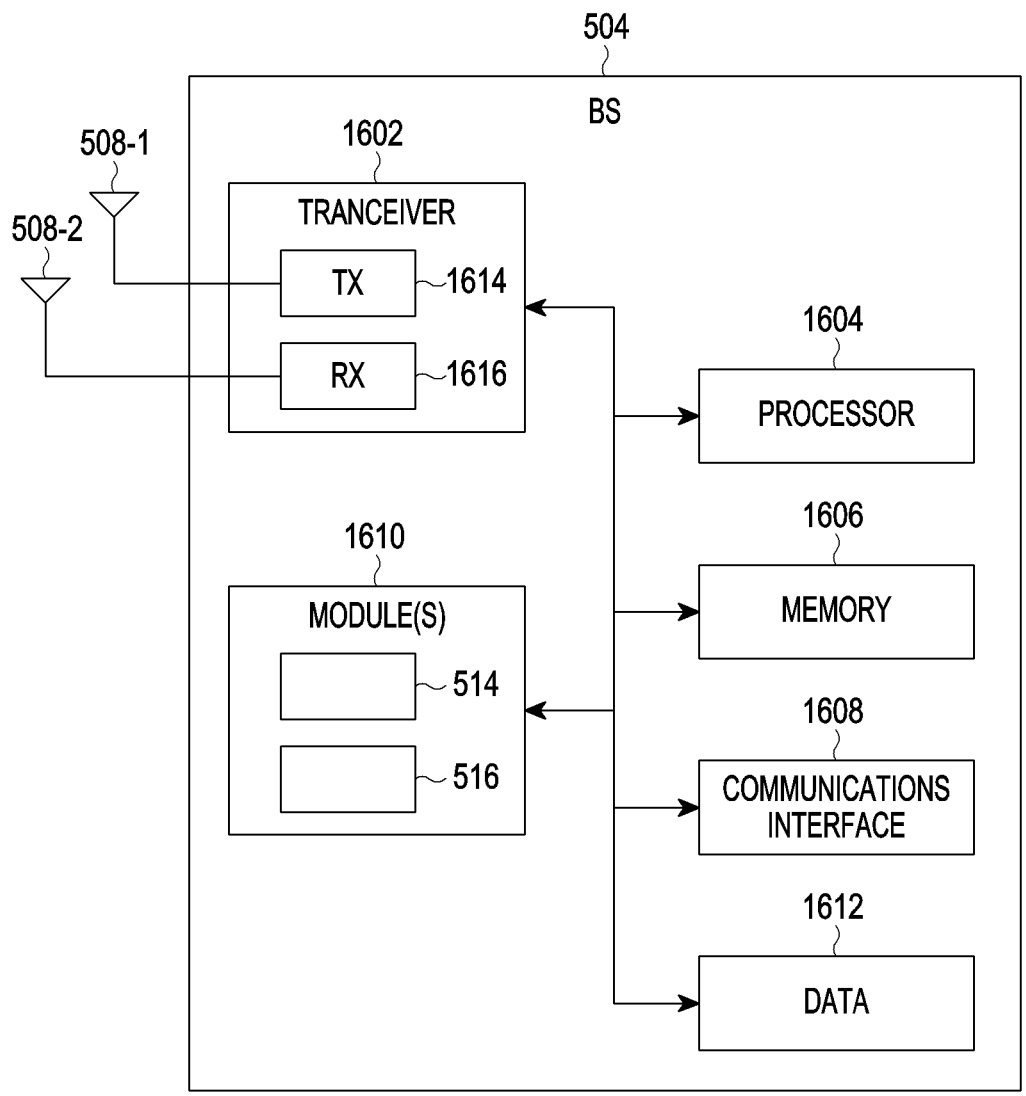
FIG. 16 illustrates a block diagram of a base station performing resource selection for a user equipment in URLLC, according to an embodiment of the disclosure.

FIG. 16 illustrates a block diagram of a base station for performing resource selection for a user equipment according to an embodiment of the disclosure.

Referring to 16, the BS 504 includes a transceiver 1602, a processor 1604, a memory 1606, a communication interface 1608, module(s) 1610, and data 1612. The transceiver 1602 may include a transmitter 1614 and a receiver 1616 for transmitting and receiving signals from the UE 502 through the antennas 508-1 to 508-2. The BS 504 may also include other components such as encoder, decoder, modulator, and demodulator for performing various operations on data being transmitted and received by the BS 504. The transceiver 1602, the processor 1604, the memory 1606, the communication interface 1608, the module(s) 1610, and the data 1612 may be communicatively coupled with each other. The data 1612 may serve, amongst other things, as a repository for storing data processed, received, and/or generated by the module(s) 1610. The communications interface 1608 may allow access to functions of the BS 504.

The processor 1604 may be a single processing unit or a number of units, all of which could include multiple computing units. The processor 1604 may be implemented as one or more microprocessors, microcomputers, microcontrollers, digital signal processors, central processing units, processor cores, multi-core processors, multiprocessors, state machines, logic circuitries, application-specific integrated circuits, field programmable gate arrays and/or any devices that manipulate signals based on operational instructions. Among other capabilities, the processor 1604 may be configured to fetch and/or execute computer-readable instructions and/or data (e.g., the data 1612) stored in the memory 1606.

The memory 1606 may include any non-transitory computer-readable medium including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The module(s) 1610, amongst other things, may include routines, programs, objects, components, data structures, etc., which perform particular tasks or implement data types. The module(s) 1610 may also be implemented as, signal processor(s), state machine(s), logic circuitries, and/or any other device or component that manipulate signals based on operational instructions.

Further, the module(s) 1610 may be implemented in hardware, instructions executed by at least one processing unit, for e.g., processor 1604, or by a combination thereof. The processing unit may comprise a computer, a processor, a state machine, a logic array and/or any other suitable devices capable of processing instructions. The processing unit may be a general-purpose processor which executes instructions to cause the general-purpose processor to perform operations or, the processing unit may be dedicated to perform the required functions. In some example embodiments, the module(s) 1610 may be machine-readable instructions (software) which, when executed by a processor/processing unit, perform any of the described functionalities.

In an embodiment, the module(s) 1610 may include the BS operations module 514 and the BS URLLC module 516. The BS operations module 514 and the BS URLLC module 516 may be in communication with each other. Further, according to some example embodiment, operation described herein as being performed by any or all of the module(s) 1610, the BS operations module 514, and the BS URLLC module 516, may be performed by at least one processor (e.g., the processor 1604) executing program code that includes instructions (e.g., the module(s) 1610) corresponding to the operations. The instructions may be stored in a memory (e.g., the memory 1606).

In accordance with the embodiments of the disclosure, the BS URLLC module 516 performs configured grant resource selection and provides the selected configured grant resources to the UE 102.

Figure 17:
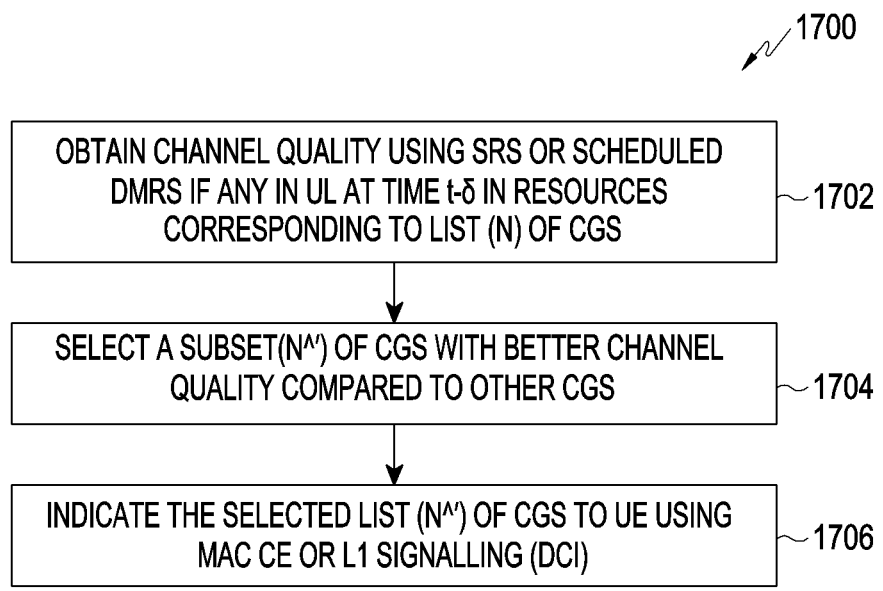
FIG. 17 illustrates an example mechanism of a base station performing resource selection, according to an embodiment of the disclosure.

FIG. 17 illustrates the example mechanism of the base station performing resource selection, according to an embodiment of the disclosure. Referring to FIG. 17 and the flow chart 1700, the BS URLLC module 516 may obtain information related to channel conditions for one or more configured grant resources available to the UE 502. The information related to channel conditions is obtained from uplink reference signals transmitted by the UE 502. The channel conditions include reference signal received power (RSRP), received signal strength indicator (RSSI), reference signal received quality (RSRQ), channel quality indicator (CQI), and signal to noise plus interference ratio (SINR). In the example, at block 1702, the BS URLLC module 516 may obtain channel quality using SRS if any in UL at time t-c in resources corresponding to list (N) of CGs.

The BS URLLC module 516 may determine a set of configured grant resources from the one or more configured grant resources for the uplink transmission based on the information and a set of configured grant parameters corresponding to each of the one or more configured grant resources. To this end, in one implementation, the BS URLLC module 516 may select a configured grant resource as the set of configured grant resources from the one or more configured grant resources based on the information. In another implementation, the BS URLLC module 516 may select a plurality of configured grant resources as the set of configured grant resources from the one or more configured grant resources based on the information and a threshold value. In the example, at block 1704, the BS URLLC module 516 may select a subset (N') of CGs with better channel quality compared to other CGs.

The BS URLLC module 516 may transmit information corresponding to the set of configured grant resources to the UE 502 for UL transmission. In the example, at block 1706, the BS URLLC module 516 may transmit the selected list (N') of CGs to UE. To this end, in one implementation, the BS URLLC module 516 may transmit the information and the set of configured grant resources using a medium access control (MAC) control element (CE). The configured grant resource(s) is transmitted as a n-bit bitmap with each bit representing a preferred status of CGs.

Figures 18A, 18B:
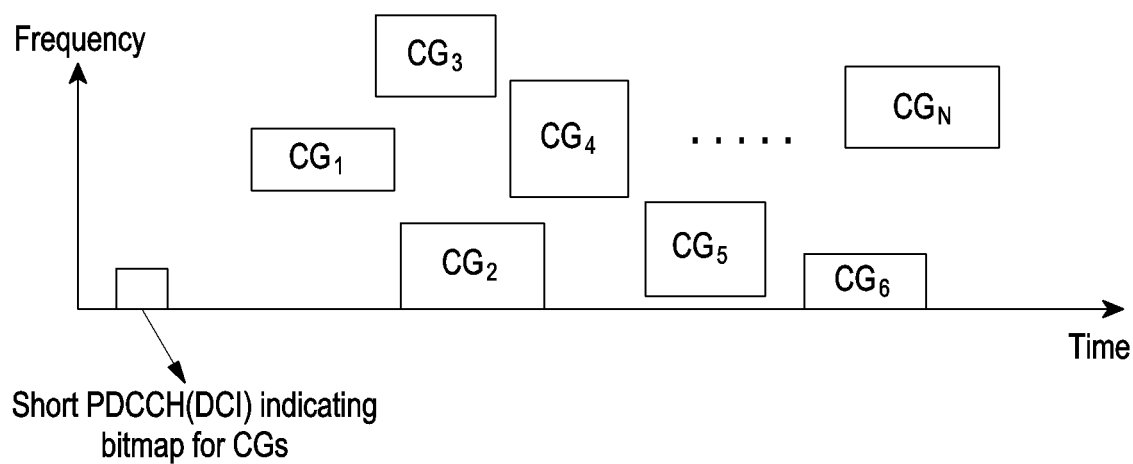
FIGS. 18A and 18B illustrate an example of sending resources to a UE, according to various embodiments of the disclosure.

FIGS. 18A and 18B illustrate an example of sending resources to a UE, according to various embodiments of the disclosure.

Referring to FIG. 18A, an example bitmap is illustrated for sending the selected CGs to the UE 502. In the example, list (N) of CGs comprises 8 CGs and selected list (N') of CGs comprises of CG2 and CG 6 based on the channel quality as measured at block 1704. Accordingly, 8-bit bitmap is generated with 2th-bit and 5th-bit are set as 1 while remaining bits are set as 0.

In another implementation, the BS URLLC module 516 may transmit the information and the set of configured grant resources using downlink control information (DCI). To this end, short PDCCH with N bit bitmap to indicate the preferred status of given CGs or $\log_2 N$ bits to indicate configured grant(s) is sent.

Referring to FIG. 18B, PDCCH signaling before multiple configured grants is illustrated. In one example implementation, a new DCI format can be introduced as a short PDCCH signalling to indicate a set of configured grants to be used for URLLC as shown in Table 2.

TABLE 2

| Parameter | No. of Bits | Description |
|---|---|---|
| Identifier of DCI format | 1 | Uplink dci format |
| Configured grant indicator | N | To indicate set of N' selected configured grants out of N grants.0 |

In another example implementation, existing DCI format can be used to accommodate the indication of configured grant in reserved bits along with the other parameters as indicated below in Table 3.

TABLE 3

| Parameter | No. of Bits | Description |
|---|---|---|
| Identifier of DCI format | 1 | Uplink dci format |
| Carrier Indicator | 0 or 3 bits | Carrier Indication |
| UL/SUL indicator | 0/1 bit | Supplementary Uplink indication |

TABLE 3-continued

| Parameter | No. of Bits | Description |
|---|---|---|
| BWP indicator | 0/1/2 bits | Bandwidth part indication |
| Configured grant indicator | N | To indicate set of N' selected configured grants out of N grants. |

In another example implementation, anew DCI format can be introduced as a short PDCCH signalling to indicate a single configured grant to be used for URLLC as shown in Table 4.

TABLE 4

| Parameter | No. of Bits | Description |
|---|---|---|
| Identifier of DCI format | 1 | Uplink dci format |
| Configured grant indicator | $\log_2 N$ | To indicate a single configured grants out of N grants |

In another example implementation, existing DCI format can be used to accommodate the indication of configured grant in reserved bits along with the other parameters as indicated below in Table 5.

TABLE 5

| Parameter | No. of Bits | Description |
|---|---|---|
| Identifier of DCI format | 1 | Uplink dci format |
| Carrier Indicator | 0 or 3 bits | Carrier Indication |
| UL/SUL indicator | 0/1 bit | Supplementary Uplink indication |
| BWP indicator | 0/1/2 bits | Bandwidth part indication |
| Configured grant indicator | $\log_2 N$ | To indicate a single configured grant out of N grants. |

Figure 19:
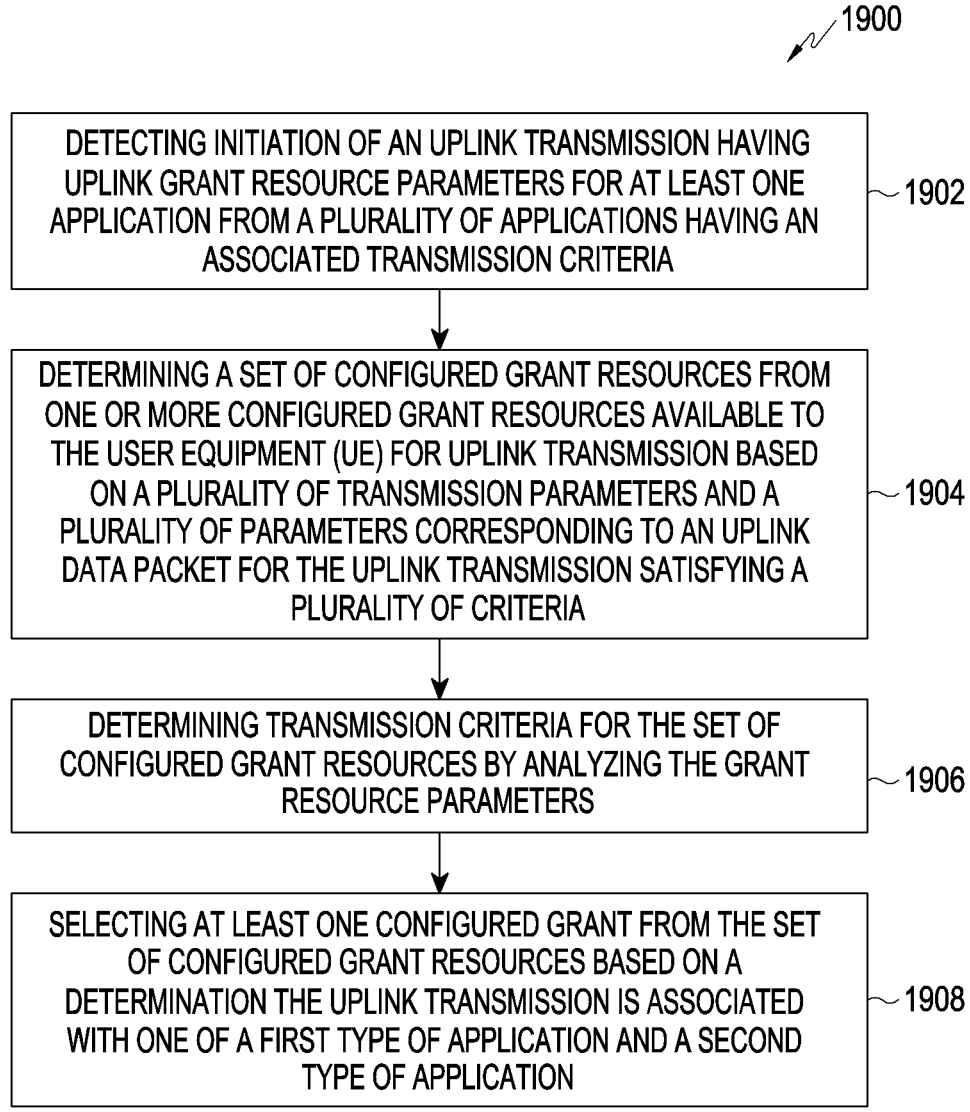
FIG. 19 illustrate flow diagram of method of resource selection for the user equipment, according to an embodiment of the disclosure.

FIG. 19 illustrates flow diagram of method of resource selection for a user equipment, according to an embodiment of the disclosure. Referring to FIG. 19, the method 1900 may be implemented by any of the processor, the UE URLLC module 512, and the UE 502 using components thereof, as described above. Further, for the sake of brevity, details of the disclosure that are explained in details in the description of FIG. 5 to FIG. 15 are not explained in detail in the description of FIG. 19.

At block 1902, the method 1900 includes detecting a need of an Uplink Transmission having Uplink Grant Resource Parameters for at least one application from a plurality of applications having an associated transmission requirement.

At block 1904, the method 1900 includes determining a set of configured grant resources available to the user equipment (UE) along with the associated plurality of Grant Resource parameters and a plurality of Uplink Transmission Parameters.

At block 1906, the method 1900 includes determining transmission capability for the set of configured Grant Resources by analyzing the Grant Resource Parameters.

At block 1908, the method 1900 includes selecting at least one configured grant from the set of configured grant resources fulfilling at least one transmission requirement of the at least one application.

In accordance with the embodiments, the plurality of Grant Resources Parameters includes a transport block size of a transport block for transmission using one or more configured grant resources, a transmission power required for transmission of the transport block, latency for transmission of the transport block, and reliability for transmission of the transport block.

In accordance with the embodiments, the Transmission Parameters include a size of the uplink data packet, an arrival time of the uplink data packet, and a transmission power required for transmitting the uplink data packet.

In accordance with the embodiments, the transmission requirement includes a transport block size requirement wherein the transport block size is one of greater than or equal to the size of the uplink data packet; a transmission power requirement wherein the transmission power required is one of less than or equal to the available transmission power of the UE; a latency requirement wherein the latency is one of less than or equal to a predetermined latency for the uplink transmission; and reliability requirement wherein the reliability is one of greater than or equal to a predetermined block error rate for the uplink transmission.

In accordance with the embodiments, selecting at least one configured grant from a set of configured grant comprises, identifying a first configured grant satisfying the plurality of transmission requirements and selecting the first configured grant for sending the Uplink Transmission.

In accordance with the embodiments, the method 1900 is further capable of detecting an error in selecting the first configured grant for sending the Uplink Transmission. The method 1900 may be further capable of identifying a second configured grant satisfying transmission requirements less than the transmission requirements satisfied by the first configured grant. The method 1900 may be further capable of selecting the second configured grant for sending the Uplink Transmission.

In accordance with the embodiments, the first type of application is having a higher requirement of reliability and a lower requirement of latency, the second type of application is having a higher requirement of reliability, a lower requirement of latency, and a lower requirement of transmission power, the third type of application requiring lower reliability and at least one of a higher latency and a high power-requirement, and the fourth type of application requiring optimized requirements in terms of reliability, latency and power-requirement.

Further, in accordance with some embodiments, the method 1900 includes ascertaining at least one configured grant from the set of configured grant resources based on a determination that the uplink transmission is associated with one of a third type of application, said third type of application not complying the transport block size requirement and the transmission power requirement. Further, the method 1900 includes performing at least one of ignoring said at least one grant associated with the third type of application for the purposes of uplink data transmission, and rendering said at least one grant associated with the third type of application as least preferred for the purposes of uplink data transmission.

Further, in accordance with some embodiments, the method 1900 includes receiving a set of configured grant parameters corresponding to each of the one or more configured grant resources from a serving cell. The method 1900 includes receiving downlink reference signals from the serving cell. The method 1900 includes determining instantaneous signal to noise plus interference ratio (SINR) of one or more subcarriers corresponding to the one or more configured grant resources. The method 1900 includes determining the plurality of transmission Parameters based on at least one of the set of configured grant parameters, the set of parameters corresponding to the uplink data packet, the downlink reference signals, and the instantaneous SINR.

In accordance with the embodiments, the set of configured grant parameters includes modulation and coding scheme (MCS), frequency resources including number of resource blocks (NRB), and time resources including starting offset, the number of uplink symbols, number of time domain symbols, and repetition factor.

Further, the method 1900 includes additional steps for determining the plurality of transmission Parameters. The method 1900 includes determining the transport block size based on the number of resource blocks (NRB), the number of uplink symbols, and the modulation and coding scheme (MCS). The method 1900 includes determining the transmission power required based on the number of resource blocks (NRB), and a downlink path-loss. The method 1900 includes determining the latency based on the starting offset, the number of time domain symbols, the repetition factor, and the arrival time of the uplink data packet. The method 1900 includes determining the reliability as a predicted block error rate based on the modulation and coding scheme (MCS), the downlink reference signals, and the instantaneous signal SINR.

Figure 20:
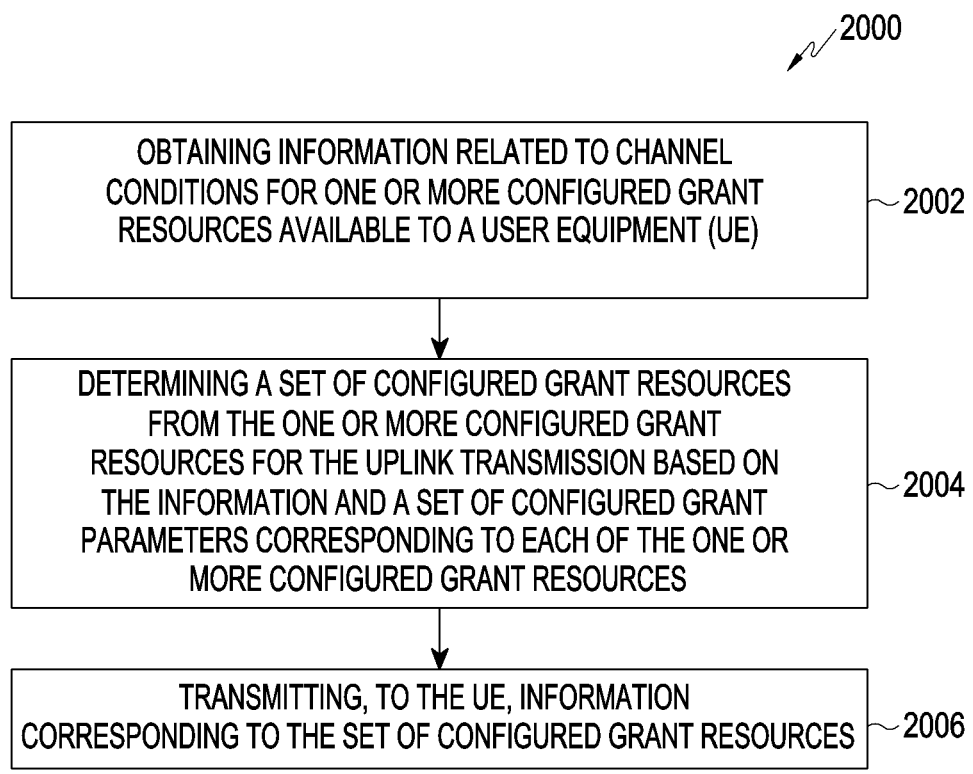
FIG. 20 illustrate flow diagram of method of resource selection for a user equipment by a serving base station, according to an embodiment of the disclosure.

FIG. 20 illustrates a flow diagram of method of resource selection for a user equipment by a serving base station, according to an embodiment of the disclosure.

Referring to FIG. 20, the method 2000 may be implemented by any of the processor, the BS URLLC module 516, and the BS 504 using components thereof, as described above. Further, for the sake of brevity, details of the disclosure that are explained in details in the description of FIG. 16 to FIG. 18A-18B are not explained in detail in the description of FIG. 20.

At block 2002, the method 2000 includes obtaining information related to channel conditions for one or more configured grant resources available to a user equipment (UE).

At block 2004, the method 2000 includes determining a set of configured grant resources from the one or more configured grant resources for the uplink transmission based on the information and a set of configured grant parameters corresponding to each of the one or more configured grant resources.

At block 2006, the method 2000 includes transmitting, to the UE, information corresponding to the set of configured grant resources.

In accordance with the embodiments, the information related to channel conditions is obtained from uplink reference signals transmitted by the UE.

In accordance with the embodiments, the channel conditions include reference signal received power (RSRP), received signal strength indicator (RSSI), reference signal received quality (RSRQ), channel quality indicator (CQI), and signal to noise plus interference ratio (SINR).

Further, the method 2000 includes additional steps for determining the set of configured grant resources. The method 2000 includes selecting a configured grant resource as the set of configured grant resources from the one or more configured grant resources based on the information. The method 2000 includes selecting a plurality of configured grant resources as the set of configured grant resources from the one or more configured grant resources based on the information and a threshold value.

Further, the method 2000 includes additional steps for transmitting the information. In one implementation, the method 2000 includes transmitting the information and the set of configured grant resources using downlink control information (DCI). In another implementation, the method 2000 includes transmitting the information and the set of configured grant resources using a medium access control (MAC) control element (CE).

Figure 21:
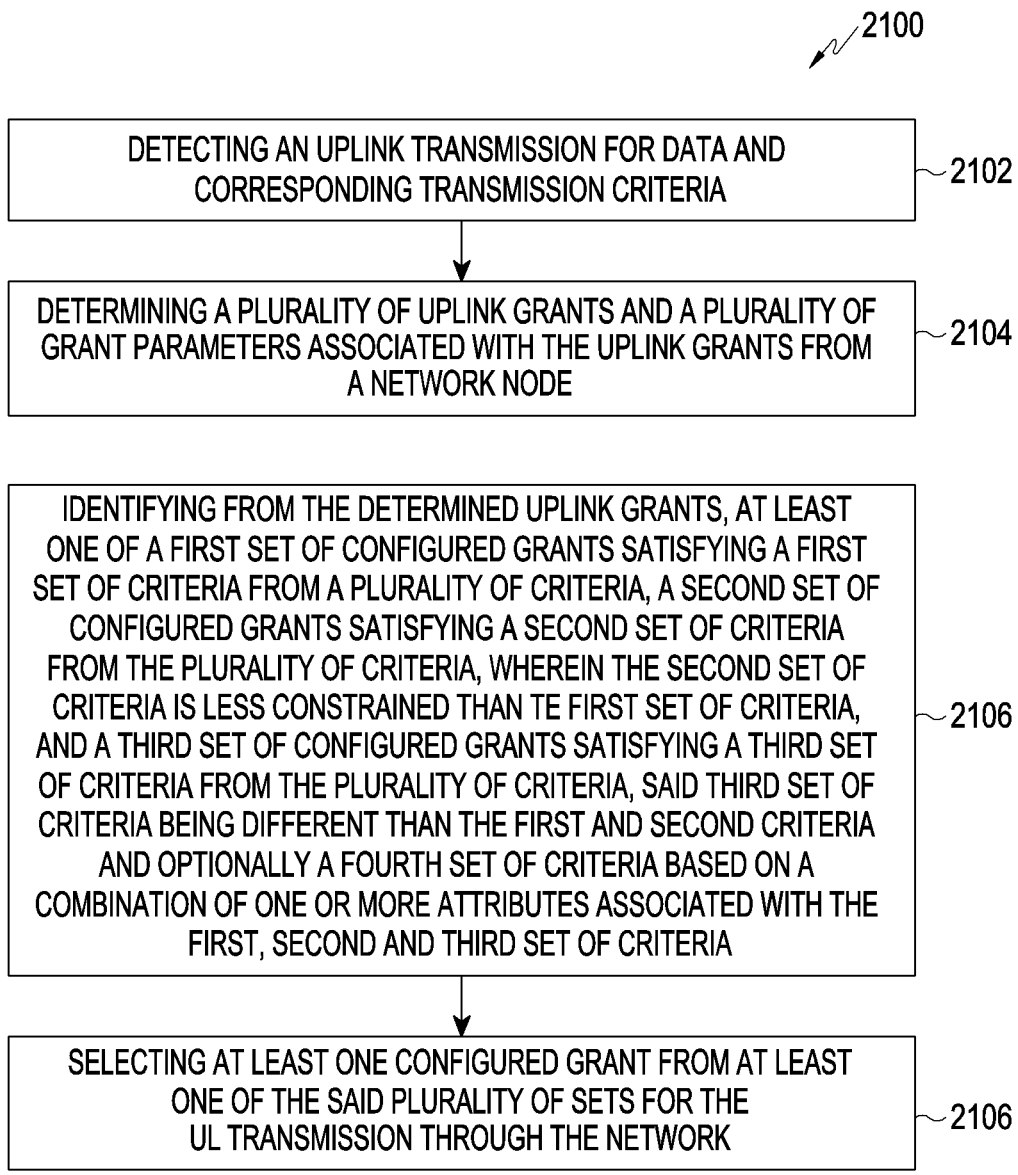
FIG. 21 illustrates flow diagram of method of resource selection for the user equipment, according to an embodiment of the disclosure.

FIG. 21 illustrates flow diagram of another embodiment of a method of resource selection for a user equipment, according to an embodiment of the disclosure.

Referring to FIG. 21, the method 2100 may be implemented by any of the processor, the BS URLLC module 516, and the BS 504 using components thereof, as described above. Further, for the sake of brevity, details of the disclosure that are explained in details in the description of FIG. 16 to FIGS. 18A to 18B are not explained in detail in the description of FIG. 21.

At block 2102, the method 2100 includes detecting a need for an Uplink Transmission and a plurality of corresponding transmission requirement;

At block 2104, the method 2100 includes determining, a plurality of Uplink Grants and a plurality of Grant Parameters associated with the uplink grants from a network node.

At block 2106, the method 2100 includes identifying from the determined uplink grants, at least one of a first set of Configured Grants satisfying the plurality of transmission requirements, a second set of Configured Grants satisfying set of transmission requirements less than the transmission requirements satisfied by the first set of Configured Grants, and a third set of Configured Grants satisfying none of the plurality of transmission requirements.

At block 2108, the method 2100 includes selecting at least one Configured Grant from at least one of the first, second, and third sets for the UL transmission through the network.

In accordance with the embodiments, the set of configured grant parameters includes modulation and coding scheme (MCS), frequency resources including number of resource blocks (NRB), and time resources including starting offset, the number of uplink symbols, number of time domain symbols, and repetition factor.

In accordance with the embodiments, the plurality of transmission requirement includes a transport block size requirement. The transport block size is one of greater than or equal to the size of the uplink data packet. The first set of transmission requirement further includes transmission power requirement. The transmission power required is one of less than or equal to the available transmission power of the UE. The first set of transmission further includes a latency requirement. The latency is one of less than or equal to a predetermined latency for the uplink transmission. The first set of transmission further includes reliability requirement. The reliability is one of greater than or equal to a predetermined block error rate for the uplink transmission.

Further, the method 2100 includes additional steps for detecting an error in selecting the at least one Configured Grant from the first set of Configured Grants. The method 2100 further includes selecting at least one Configured Grant from the second set of Configured Grants.

Further, the method 2100 includes additional steps for detecting an error in selecting the at least one Configured Grant from the second set of Configured Grants. The method 2100 further selects at least one Configured Grant from the third set of Configured Grants.

While specific language has been used to describe the disclosure, any limitations arising on account thereto, are not intended. As would be apparent to a person in the art, various working modifications may be made to the method in order to implement the disclosure as taught herein. The drawings and the foregoing description give examples of embodiments. While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A method of resource selection by a user equipment (UE), the method comprising:
   detecting a need of an uplink transmission for at least one application from a plurality of applications;
   determining a set of configured grant (CG) resources from a plurality of CG resources available to the UE based on a plurality of grant resource parameters related to each of the plurality of CG resources and a plurality of transmission parameters for the uplink transmission; and
   selecting at least one CG resource for the uplink transmission from the determined set of CG resources satisfying at least one transmission requirement of the at least one application,
   wherein the selecting of the at least one CG resource from the set of CG resources comprises:
      identifying a first CG resource satisfying the at least one transmission requirement, and
      if an error is detected in selecting the first CG resource for sending the uplink transmission:
         identifying a second CG resource satisfying transmission requirement less than the transmission requirement satisfied by the first CG resource, and
         selecting the second CG resource for sending the uplink transmission.

2. The method of claim 1,
   wherein the plurality of grant resource parameters comprise a transport block size of a transport block for transmission using one or more configured grant resources, a transmission power required for transmission of the transport block, a latency for transmission of the transport block, and a reliability for transmission of the transport block, and
   wherein the plurality of transmission parameters comprise a size of an uplink data packet, an arrival time of the uplink data packet, and a transmission power required for transmitting the uplink data packet.

3. The method of claim 1, wherein a transmission requirement for the at least one application comprises at least one of:
   a transport block size requirement where a transport block size is greater than or equal to a size of an uplink data packet,
   a transmission power requirement where transmission power required is less than or equal to an available transmission power of the UE,
   a latency requirement where a latency is less than or equal to a predetermined latency for the uplink transmission, or
   a reliability requirement where a reliability is greater than or equal to a predetermined block error rate for the uplink transmission.

4. The method of claim 1, further comprising:
   ascertaining the at least one CG resource from the set of CG resources based on a determination that the uplink transmission is associated with one of a third type of application, the third type of application not complying with a transport block size requirement and a requirement of transmission power; and performing at one least of:
ignoring the at least one CG resource associated with the third type of application for purposes of uplink data transmission, or
rendering the at least one CG resource associated with the third type of application as least preferred for the purposes of uplink data transmission.

5. The method of claim 1, further comprising:
receiving a set of CG parameters corresponding to each of one or more CG resources from a serving cell;
receiving downlink reference signals from the serving cell;
determining instantaneous signal to noise plus interference ratio (SINR) of one or more subcarriers corresponding to the one or more CG resources; and
determining the plurality of grant resource parameters based on at least one of the set of CG parameters, a set of CG parameters corresponding to an uplink data packet, the downlink reference signals, or the instantaneous SINR,
wherein the set of CG parameters comprises a modulation and coding scheme (MCS), frequency resources including a number of resource blocks (NRB), time resources including a starting offset, a number of uplink symbols, a number of time domain symbols, and a repetition factor.

6. A user equipment (UE) performing resource selection, the UE comprising:
a memory configured to store computer readable instructions; and
at least one processor configured to execute the computer readable instructions to:
detect a need of an uplink transmission for at least one application from a plurality of applications,
determine a set of configured grant (CG) resources from a plurality of CG resources available to the UE based on a plurality of grant resource parameters related to each of the plurality of CG resources and a plurality of transmission parameters for the uplink transmission, and
select at least one CG resource for the uplink transmission from the determined set of CG resources satisfying at least one transmission requirement of the at least one application,
wherein for selecting the at least one CG resource from the set of CG resources, the at least one processor is configured to:
identify a first CG resource satisfying the at least one transmission requirement, and
if an error is detected in selecting the first CG resource for sending the uplink transmission:
identify a second CG resource satisfying transmission requirement less than the transmission requirement satisfied by the first CG resource, and
select the second CG resource for sending the uplink transmission.

7. The UE of claim 6,
wherein the plurality of grant resource parameters comprise a transport block size of a transport block for transmission using one or more CG resources, a transmission power required for transmission of the transport block, a latency for transmission of the transport block, and a reliability for transmission of the transport block, and
wherein a set of parameters corresponding to an uplink data packet comprises a size of the uplink data packet, an arrival time of the uplink data packet, and a transmission power required for transmitting the uplink data packet.

8. The UE of claim 6, wherein a transmission requirement for the at least one application comprises at least one of:
a transport block size requirement where a transport block size is greater than or equal to a size of an uplink data packet,
a transmission power requirement where transmission power required is less than or equal to an available transmission power of the UE,
a latency requirement where a latency is less than or equal to a predetermined latency for the uplink transmission, or
a reliability requirement where a reliability is greater than or equal to a predetermined block error rate for the uplink transmission.

9. The UE of claim 6, wherein the at least one processor is further configured to execute the computer readable instructions to:
ascertain the at least one CG resource from the set of CG resources based on a determination that the uplink transmission is associated with one of a third type of application, the third type of application not complying with a transport block size requirement and a requirement of transmission power; and
perform at one least of:
ignoring the at least one CG resource associated with the third type of application for purposes of uplink data transmission, or
rendering the at least one CG resource associated with the third type of application as least preferred for the purposes of uplink data transmission.

10. The UE of claim 6,
wherein the at least one processor is further configured to execute the computer readable instructions to:
receive a set of CG parameters corresponding to each of the CG resources and downlink reference signals from a serving cell,
determine instantaneous signal to noise plus interference ratio (SINR) of one or more subcarriers corresponding to the CG resources, and
determine the plurality of grant resource parameters based on at least one of the set of CG parameters, a set of parameters corresponding to an uplink data packet, the downlink reference signals, or the instantaneous SINR, and
wherein the set of CG parameters comprises a modulation and coding scheme (MCS), frequency resources including a number of resource blocks (NRB), time resources including a starting offset, a number of uplink symbols, a number of time domain symbols, and a repetition factor.

* * * * *